US010530699B2

(12) United States Patent
Ni et al.

(10) Patent No.: US 10,530,699 B2
(45) Date of Patent: Jan. 7, 2020

(54) PROCESSING METHOD, APPARATUS, AND SYSTEM FOR A SERVICE FLOW PROCESSING POLICY

(71) Applicant: Huawei Technologies Co., Ltd., Shenzhen, Guangdong (CN)

(72) Inventors: Hui Ni, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/921,415

(22) Filed: Mar. 14, 2018

(65) Prior Publication Data

US 2018/0205659 A1 Jul. 19, 2018

Related U.S. Application Data

(63) Continuation of application No. PCT/CN2015/091253, filed on Sep. 30, 2015.

(51) Int. Cl.
*H04L 12/851* (2013.01)
*H04L 12/715* (2013.01)
(Continued)

(52) U.S. Cl.
CPC .......... *H04L 47/2483* (2013.01); *H04L 45/04* (2013.01); *H04L 45/42* (2013.01); *H04L 45/64* (2013.01); *H04L 45/745* (2013.01)

(58) Field of Classification Search
CPC ..... H04L 47/2483; H04L 45/64; H04L 45/04; H04L 45/42; H04L 45/02; H04L 43/10
See application file for complete search history.

(56) References Cited

U.S. PATENT DOCUMENTS 8,451,841 B2 5/2013 Siegel et al.
2011/0022722 A1 1/2011 Castellanos Zamora et al.
(Continued)

FOREIGN PATENT DOCUMENTS

CN 101500214 A 8/2009
CN 102185834 A 9/2011
(Continued)

OTHER PUBLICATIONS

Open Networking Foundation; "OpenFlow Switch Specification Version 1.2 (Wire Protocol 0x03)"; ONF TS-003; Dec. 5, 2011; 85 pages.
(Continued)

*Primary Examiner* — Vinncelas Louis
(74) *Attorney, Agent, or Firm* — Conley Rose, P.C.

(57) ABSTRACT

The present disclosure provides processing method including: receiving, by a forwarding plane device, an operation request of a service flow processing policy from a first control domain, the operation request of the service flow processing policy includes a service flow identifier corresponding to a to-be-processed policy; obtaining an identifier of the first control domain according to the operation request of the service flow processing policy; determining whether to allow the first control domain to operate the to-be-processed policy; and if the forwarding plane device determines to allow the first control domain to operate the to-be-processed policy, operating the to-be-processed policy according to the operation request of the service flow processing policy.

20 Claims, 12 Drawing Sheets

(51) Int. Cl.
*H04L 12/717* (2013.01)
*H04L 12/741* (2013.01)

(56) References Cited

U.S. PATENT DOCUMENTS

| | | | |
|---|---|---|---|
| 2014/0241365 | A1 | 8/2014 | Iisohi et al. |
| 2014/0295852 | A1 | 10/2014 | Wu et al. |
| 2015/0036542 | A1 | 2/2015 | Xia et al. |
| 2015/0139238 | A1* | 5/2015 | Pourzandi ............... H04L 45/42 370/392 |
| 2015/0156674 | A1 | 6/2015 | Tan et al. |
| 2015/0249587 | A1* | 9/2015 | Kozat .................... H04L 43/10 370/222 |
| 2016/0013969 | A1 | 1/2016 | Casado et al. |
| 2018/0227224 | A1* | 8/2018 | Bhaskar ................. H04L 45/02 |

FOREIGN PATENT DOCUMENTS

| | | | |
|---|---|---|---|
| CN | 102231889 | A | 11/2011 |
| CN | 102726101 | A | 10/2012 |
| CN | 103209121 | A | 7/2013 |
| CN | 103491015 | A | 1/2014 |
| CN | 103493439 | A | 1/2014 |
| CN | 103718640 | A | 4/2014 |
| CN | 104539442 | A | 4/2015 |
| EP | 2975807 | A1 | 1/2016 |
| JP | 2010541426 | A | 12/2010 |
| JP | 2014530514 | A | 11/2014 |
| WO | 2012098779 | A1 | 7/2012 |
| WO | 2015/071888 | A1 | 5/2015 |

OTHER PUBLICATIONS

Machine Translation and Abstract of Chinese Publication No. CN101500214, Aug. 5, 2009, 34 pages.
Machine Translation and Abstract of Chinese Publication No. CN102185834, Sep. 14, 2011, 14 pages.
Foreign Communication From a Counterpart Application, Chinese Application No. 201580033909.X, Chinese Office Action dated May 24, 2019, 30 pages.
Machine Translation and Abstract of International Publication No. WO2012098779, Jul. 26, 2012, 24 pages.
Foreign Communication From A Counterpart Application, Japanese Application No. 2018-516562, Japanese Office Action dated May 13, 2019, 5 pages.
Foreign Communication From A Counterpart Application, Japanese Application No. 2018-516562, English Translation of Japanese Office Action dated May 13, 2019, 6 pages.

* cited by examiner

PROCESSING METHOD, APPARATUS, AND SYSTEM FOR A SERVICE FLOW PROCESSING POLICY

CROSS-REFERENCE TO RELATED APPLICATIONS

This application is a continuation of International Application No. PCT/CN2015/091253, filed on Sep. 30, 2015, the disclosure of which is hereby incorporated by reference in its entirety.

TECHNICAL FIELD

Embodiments of the present application relate to communications technologies, and in particular, to a processing method, apparatus, and system for a service flow processing policy.

BACKGROUND

As the scale of the Internet rapidly expands, networks become indispensable in people's daily life, and network services become increasingly diverse and complex. As key nodes in network services, switching devices include a very limited quantity of open interfaces because of monopoly of existing device providers, and test and verification cannot be performed on many open ideas and protocols of networks.

In a common solution, a software defined networking (SDN) idea is introduced to an evolved packet core (EPC) architecture. FIG. 1 is a schematic diagram of separating and deploying a control plane and a forwarding plane of a mobile gateway. A control plane function and a forwarding plane function of a switching device (for example: a gateway) are separated, to obtain an architecture in which a control plane and a forwarding plane of the gateway are separated, as shown in FIG. 1. A mobility management entity (MME), a policy and charging rules function (PCRF), a home subscriber server (HSS), and a gateway-controller plane (GW-C) are all referred to as control plane network elements. The entire system architecture includes multiple control plane network elements. The multiple control plane network elements can determine a data processing policy related to user equipment, and send the policy to a gateway forwarding plane (GW-U) by using an interface between a control plane and a forwarding plane (for example, an OpenFlow interface). The gateway forwarding plane processes a data packet of the user equipment according to the policy.

After a control plane and a forwarding plane are separated in deployment as described above, multiple virtual network functions are presented as a control plane network element. Limited by factors such as a control range of a controller and network management and planning, a network architecture may include multiple such control plane network elements. That is, each controller in each control plane network element may operate a processing policy of a data packet of user equipment. Consequently, a service flow is maliciously controlled and cannot correctly reach a peer end.

SUMMARY

Embodiments of the present disclosure provide a processing method, apparatus, and system for a service flow processing policy, to resolve a problem that limited by factors such as a control range of a controller and network management and planning, a network architecture may include multiple such control plane network elements, that is, each controller in each control plane network element may operate a processing policy of a data packet of user equipment, and consequently, a service flow is maliciously controlled and cannot correctly reach a peer end.

According to a first aspect of the present disclosure, a processing method for a service flow processing policy is provided, including:

receiving, by a forwarding plane device, an operation request of the service flow processing policy from a first control domain, where the operation request of the service flow processing policy includes a service flow identifier corresponding to a to-be-processed policy;

obtaining, by the forwarding plane device, an identifier of the first control domain according to the operation request of the service flow processing policy;

determining, by the forwarding plane device according to the identifier of the first control domain and a pre-obtained correspondence between a control domain identifier and a service flow identifier, whether to allow the first control domain to operate the to-be-processed policy; and if the forwarding plane device determines to allow the first control domain to operate the to-be-processed policy, operating, by the forwarding plane device, the to-be-processed policy according to the operation request of the service flow processing policy.

According to a second aspect of the present disclosure, a processing method for a service flow processing policy is provided, including:

sending, by a first controller, an operation request of the service flow processing policy to a forwarding plane device, so that the forwarding plane device determines, according to the operation request of the service flow processing policy and a pre-obtained correspondence between a control domain identifier and a service flow identifier, whether to allow the first controller to operate a to-be-processed policy; and when a determining result is that the first controller is allowed to operate the to-be-processed policy, operates the to-be-processed policy according to the operation request of the service flow processing policy, where the operation request of the service flow processing policy includes a service flow identifier corresponding to the to-be-processed policy.

According to a third aspect of the present disclosure, a processing method for a service flow processing policy is provided, including:

receiving, by a second controller, a request for switching control right, where the request for switching control right is used to instruct the second controller to manage a service flow processing policy originally corresponding to a first controller; and sending, by the second controller, an operation request for switching control domain to a forwarding plane device, where the operation request for switching control domain is used to instruct the forwarding plane device to update a correspondence between a control domain identifier and a service flow identifier.

According to the service flow processing policy processing method, apparatus, and system provided in the present disclosure, based on the correspondence between a control domain identifier and a service flow that is recorded by the forwarding plane device, different service flow processing policies of the forwarding plane device are isolated from different control domains. That is, after the forwarding plane device receives the operation request of the service flow processing policy of a control domain, the forwarding plane device obtains an identifier of the control domain, and determines, according to a correspondence that is between a control domain identifier and a service flow and that is obtained in advance, whether to allow the control domain to operate a service flow processing policy. If the control domain corresponds to a service flow, the control domain has management permission, and can perform an operation according to the operation request. If the control domain has no management and control capabilities for the service flow processing policy, the control domain cannot perform an operation. Therefore, the service flow processing policy of a forwarding plane is isolated from different control domains, a controller having no permission is prevented from modifying the service flow processing policy, and a service flow is processed more correctly and securely.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
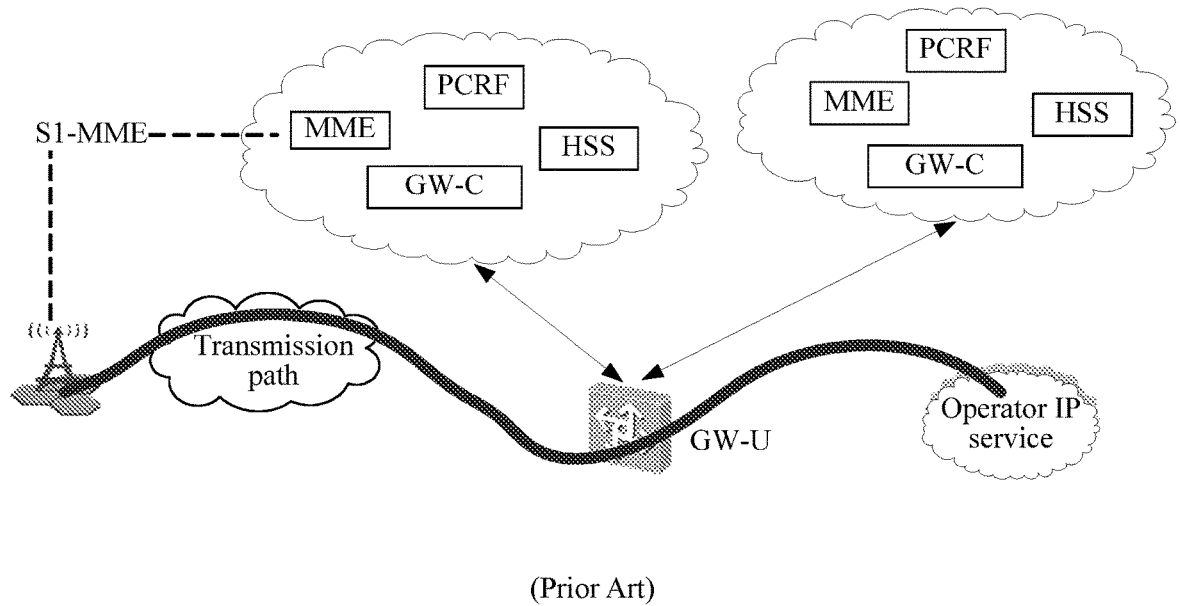
FIG. 1 is a schematic diagram of separating and deploying a control plane and a forwarding plane of a mobile gateway.
Figure 2A:
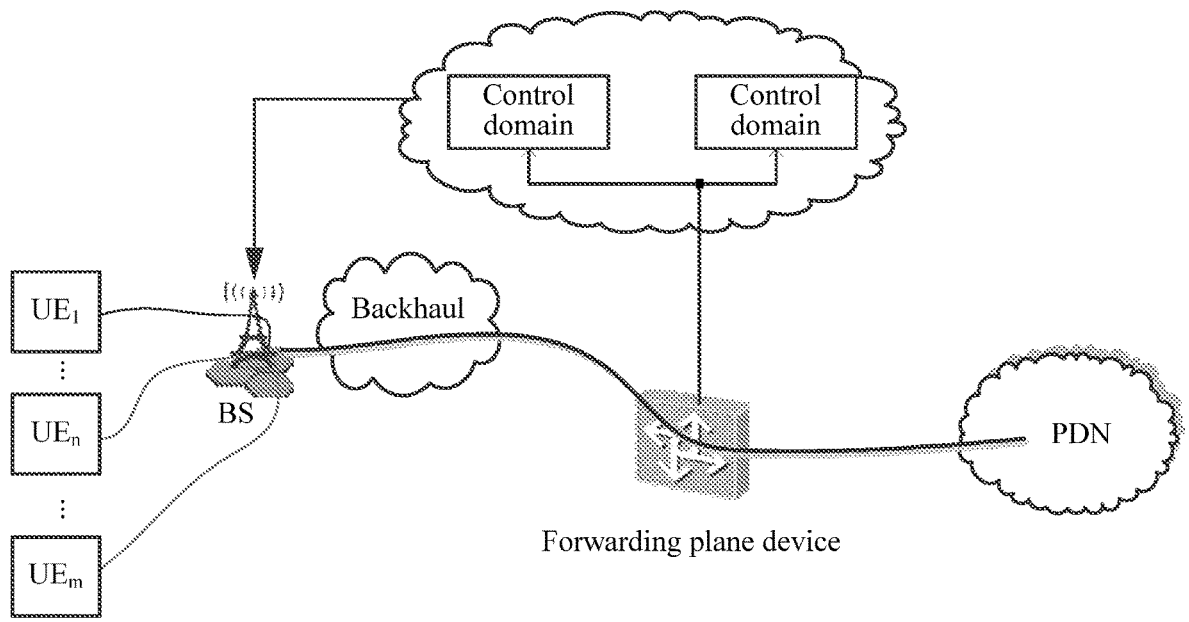
FIG. 2a is a schematic diagram of a network architecture of a technical solution according to an embodiment of the present disclosure.
Figure 2B:
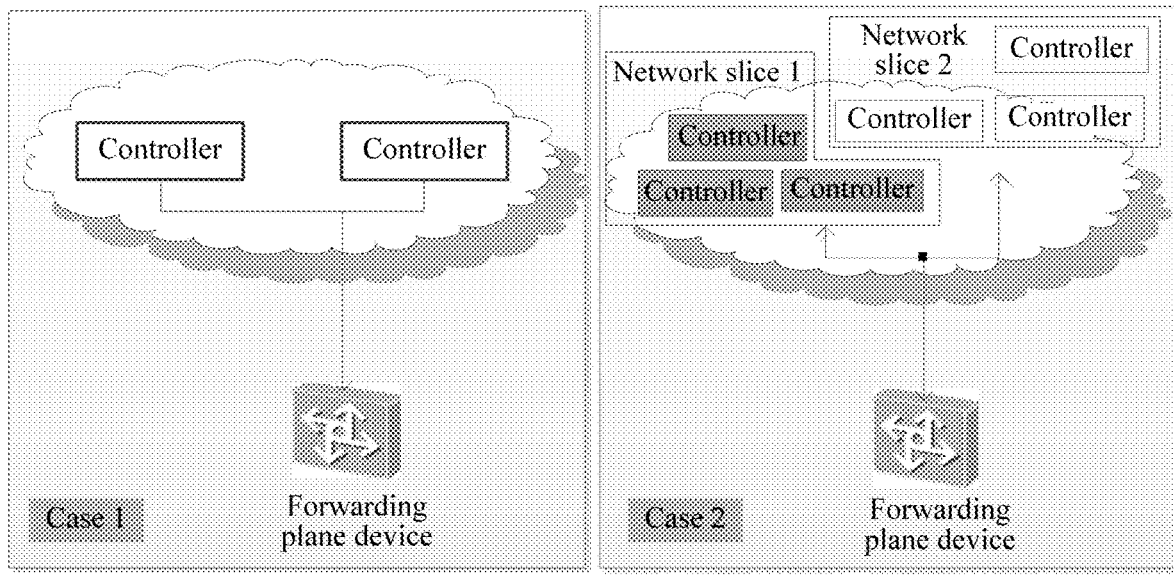
FIG. 2b is a schematic diagram of a control domain of a technical solution according to an embodiment of the present disclosure.

FIG. 2a is a schematic diagram of a network architecture of a technical solution according to an embodiment of the present disclosure. FIG. 2b is a schematic diagram of a control domain of a technical solution according to an embodiment of the present disclosure. As shown in FIG. 2a and FIG. 2b, when a gateway control plane and a gateway forwarding plane are separated, a method for implementing multiple control domains provided in the present disclosure can effectively resolve a flow rule isolation problem when multiple control domains control a single forwarding plane device, and implement migration of a flow rule of the forwarding plane device between multiple control domains. A specific architecture thereof includes: m user equipments (UE), a base station (BS), a forwarding plane device, at least one control domain, and a public data network (PDN). There are generally multiple control domains. As shown in FIG. 2b, FIG. 2b shows two cases of forming a control domain. A control domain shown in the figure may be one controller, or may be a controller group including multiple controllers, or may be one or more network slices including one or more controllers. That is, a control domain is a controller, a controller group, or a network slice. The controller group includes at least two controllers, and the network slice includes at least one controller.

UE refers to a network terminal device, and includes but is not limited to a mobile phone, a network access terminal device, a terminal device of Internet of Things, or the like. A BS refers to a device that provides wireless access to a terminal device, and includes but is not limited to an eNodeB, a WiFi access point, a WiMAX base station, or the like. A controller refers to a network element function that is in a network and that is responsible for delivering a forwarding instruction to a forwarding plane to instruct the forwarding plane to process and forward a packet. The controller is, for example, a controller formed by combining a SDN controller, a control plane function corresponding to a mobile gateway, or a controller formed by merging a separated GW-C with traditional control network elements of 3rd Generation Partnership Project (3GPP) such as a MME, a PCRF, and a HSS. The forwarding plane device in the present disclosure refers to a network element function that is in a network and that forwards a packet, and is, for example, an SDN switch, a mobile gateway forwarding network element (a gateway, abase station, or the like), a fixed network switch, a router, or the like.

In the embodiments of this specification, a controller delivers a user packet processing policy to the forwarding plane device. The user packet processing policy may be performing a processing function such as quality of service (QoS) control over a packet, online/offline charging, deep packet inspection (DPI), cache, lawful interception, Transfer Control Protocol (TCP) acceleration, Hypertext Transfer Protocol (HTTP) header enrichment, or packet forwarding on a packet. A packet forwarding processing operation such as a downlink packet forwarding operation is: a forwarding plane device→a BS. In a specific implementation, a forwarding operation may be based on an identifier such as an IP address, a Media Access Control (MAC) address, or a port number of a target network element, or may be based on another forwarding manner such as a point-to-point tunnel, or may be based on a forwarding mechanism of a service chain. This is not limited in the present disclosure.

Figure 3:
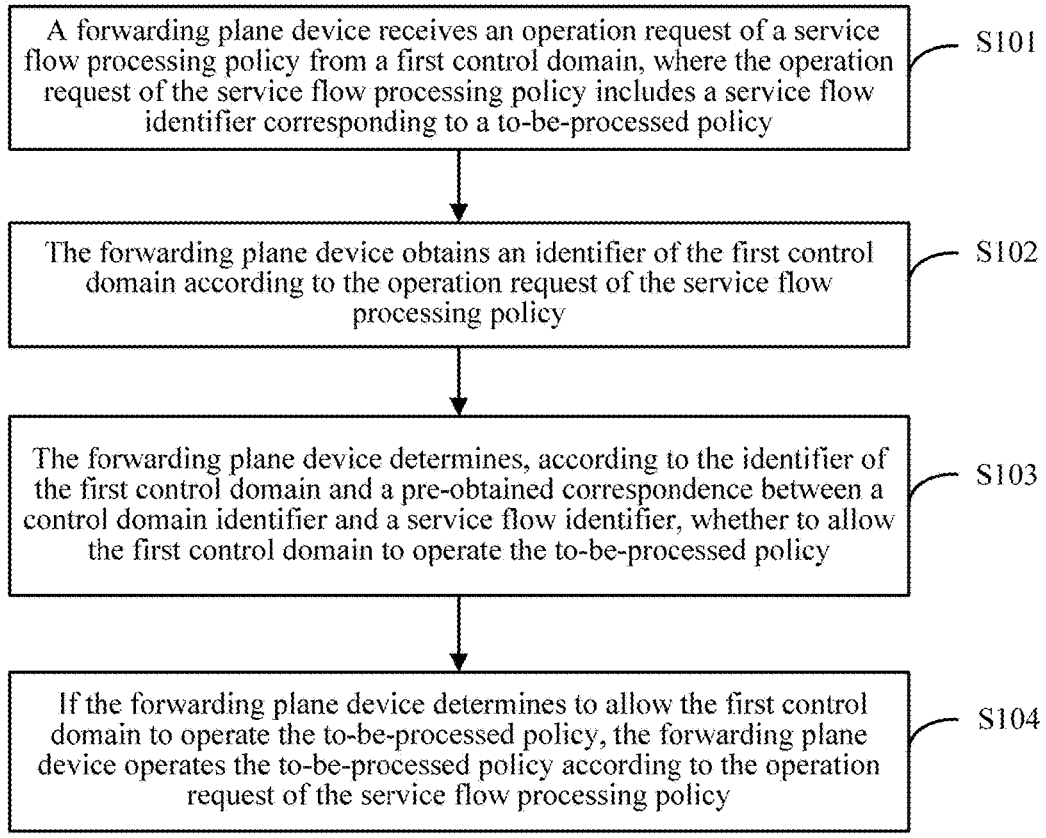
FIG. 3 is a flowchart of Embodiment 1 of a processing method for a service flow processing policy according to the embodiments of the present disclosure.

FIG. 3 is a flowchart of Embodiment 1 of a processing method for a service flow processing policy according to the embodiments of the present disclosure. As shown in FIG. 3, based on the foregoing network architecture, this embodiment is executed by a forwarding plane device. Specific implementation steps of the service flow processing policy processing method are as follows:

S101: A forwarding plane device receives an operation request of a service flow processing policy from a first control domain, where the operation request of the service flow processing policy includes a service flow identifier corresponding to a to-be-processed policy.

In this embodiment, the first control domain is a controller, a controller group, or a network slice. The controller group includes at least two controllers, and the network slice includes at least one controller.

Before this step, the forwarding plane device has received and installed a service flow processing policy of the first control domain or another control domain. Generally, the service flow processing policy includes at least a parameter of identifier information corresponding to a user service flow, and the parameter is used to perform matching with a received user packet.

When the first control domain needs to modify the to-be-processed policy, the first control domain needs to generate, according to an access request message of a user, a service flow processing policy that is needed to control a service flow of the user, and send an operation request to the forwarding plane device. That is, the forwarding plane device receives the operation request of the service flow processing policy from the first control domain.

That is, optionally, before this step, the forwarding plane device receives a request for installing a service flow processing policy from at least one control domain. A request for installing a service flow processing policy from each control domain includes a service flow processing policy and a service flow identifier corresponding to the service flow processing policy. The forwarding plane device obtains a correspondence between a control domain identifier of each control domain and a service flow identifier according to the at least one request for installing a service flow processing policy.

S102: The forwarding plane device obtains an identifier of the first control domain according to the operation request of the service flow processing policy.

In this embodiment, during specific implementation, the operation request of the service flow processing policy may directly carry the identifier of the first control domain. That is, the forwarding plane device may directly obtain the identifier of the first control domain that is carried in the operation request of the service flow processing policy. In addition, the forwarding plane device may implicitly obtain the identifier of the first control domain by using a control connection identifier (for example, a source IP address of a control message) between a controller and a forwarder. That is, the forwarding plane device uses a source Internet Protocol address or a source port number that is included in the operation request of the service flow processing policy as the identifier of the first control domain. Optionally, the forwarding plane device may use a control session identifier corresponding to the operation request of the service flow processing policy as the identifier of the first control domain. Alternatively, the forwarding plane device uses an identifier of a network slice corresponding to the operation request of the service flow processing policy as the identifier of the first control domain.

S103: The forwarding plane device determines, according to the identifier of the first control domain and a pre-obtained correspondence between a control domain identifier and a service flow identifier, whether to allow the first control domain to operate the to-be-processed policy.

In this embodiment, when the forwarding plane device receives an operation request of the service flow processing policy (for example, requesting to install, delete, or modify a policy), the forwarding plane device first obtains, according to a received request message, the identifier of the first control domain and information about the identifier of the service flow that needs to be operated, and performs authentication on the request message according to the pre-obtained correspondence between a control domain identifier and a service flow identifier, that is, according to a control domain identifier corresponding to the information about the service flow identifier that is obtained in advance. Authentication refers to determining whether the first control domain sending the request can operate a processing policy corresponding to the service flow.

A specific authentication manner is: obtaining, by the forwarding plane device according to the pre-obtained correspondence between a control domain identifier and a service flow identifier, a control domain identifier corresponding to the service flow identifier corresponding to the to-be-processed policy; and determining, by the forwarding plane device, whether the identifier of the first control domain is the same as the control domain identifier corresponding to the service flow identifier corresponding to the to-be-processed policy; and if the identifier of the first control domain is the same as the control domain identifier corresponding to the service flow identifier corresponding to the to-be-processed policy, allowing the first control domain to operate the processing policy of the to-be-processed service flow; or if the identifier of the first control domain is different from the control domain identifier corresponding to the service flow identifier corresponding to the to-be-processed policy, disallowing the first control domain to operate the processing policy of the to-be-processed service flow.

In a specific implementation, the forwarding plane device may receive an operation request of the service flow processing policy from a controller. The forwarding plane device obtains an identifier of a control domain to which the controller belongs, performs authentication on the controller in a manner that is the same as that described above, and when determining to allow the control domain to which the controller belongs to operate the to-be-processed policy, processes the to-be-processed policy.

S104: If the forwarding plane device determines to allow the first control domain to operate the to-be-processed policy, the forwarding plane device operates the to-be-processed policy according to the operation request of the service flow processing policy.

On a side of the first control domain, for example, only one first controller is included, and this solution is: sending, by the first controller, the operation request of the service flow processing policy to the forwarding plane device, so that the forwarding plane device determines, according to the operation request of the service flow processing policy and the pre-obtained correspondence between a control domain identifier and a service flow identifier, whether to allow the first controller to operate the to-be-processed policy; and when a determining result is that the first controller is allowed to operate the to-be-processed policy, operates the to-be-processed policy according to the operation request of the service flow processing policy.

In this embodiment, if the identifier of the first control domain that is obtained according to a message of the operation request of the service flow processing policy is inconsistent with the recorded control domain identifier corresponding to the service flow identifier, authentication fails. Optionally, the forwarding plane device sends a failure response to the sending party that sends the request message. If the identifier of the first control domain that is obtained according to a message of the operation request of the service flow processing policy is consistent with the recorded control domain identifier corresponding to the service flow identifier, authentication succeeds. The forwarding plane device installs, deletes, or modifies the service flow processing policy according to the request message.

According to the service flow processing policy processing method provided in this embodiment, based on the correspondence between a control domain identifier and a service flow identifier that is recorded by the forwarding plane device, different service flow processing policies of the forwarding plane device are isolated from different control domains. That is, after the forwarding plane device receives the operation request of the service flow processing policy of a control domain, the forwarding plane device obtains an identifier of the control domain, and determines, according to a correspondence that is between a control domain identifier and a service flow and that is obtained in advance, whether to allow the control domain to operate a service flow processing policy. If the control domain corresponds to a service flow, the control domain has management permission, and can perform an operation according to the operation request. If the control domain does not correspond to a service flow, the control domain has no management and control capabilities for the service flow processing policy, and cannot perform an operation. Therefore, the service flow processing policy of a forwarding plane is isolated from different control domains, a controller having no permission is prevented from modifying the service flow processing policy, and a service flow is processed more correctly and securely.

Based on the foregoing embodiment and the foregoing network architecture, an implementation process of this solution is specifically described with reference to each network element. It is assumed that two control domains: a control domain 1 and a control domain 2 are included, each control domain includes two controllers: a controller 1 and a controller 2, and UE, a BS, and a forwarding plane device are further included.

Figure 4A:
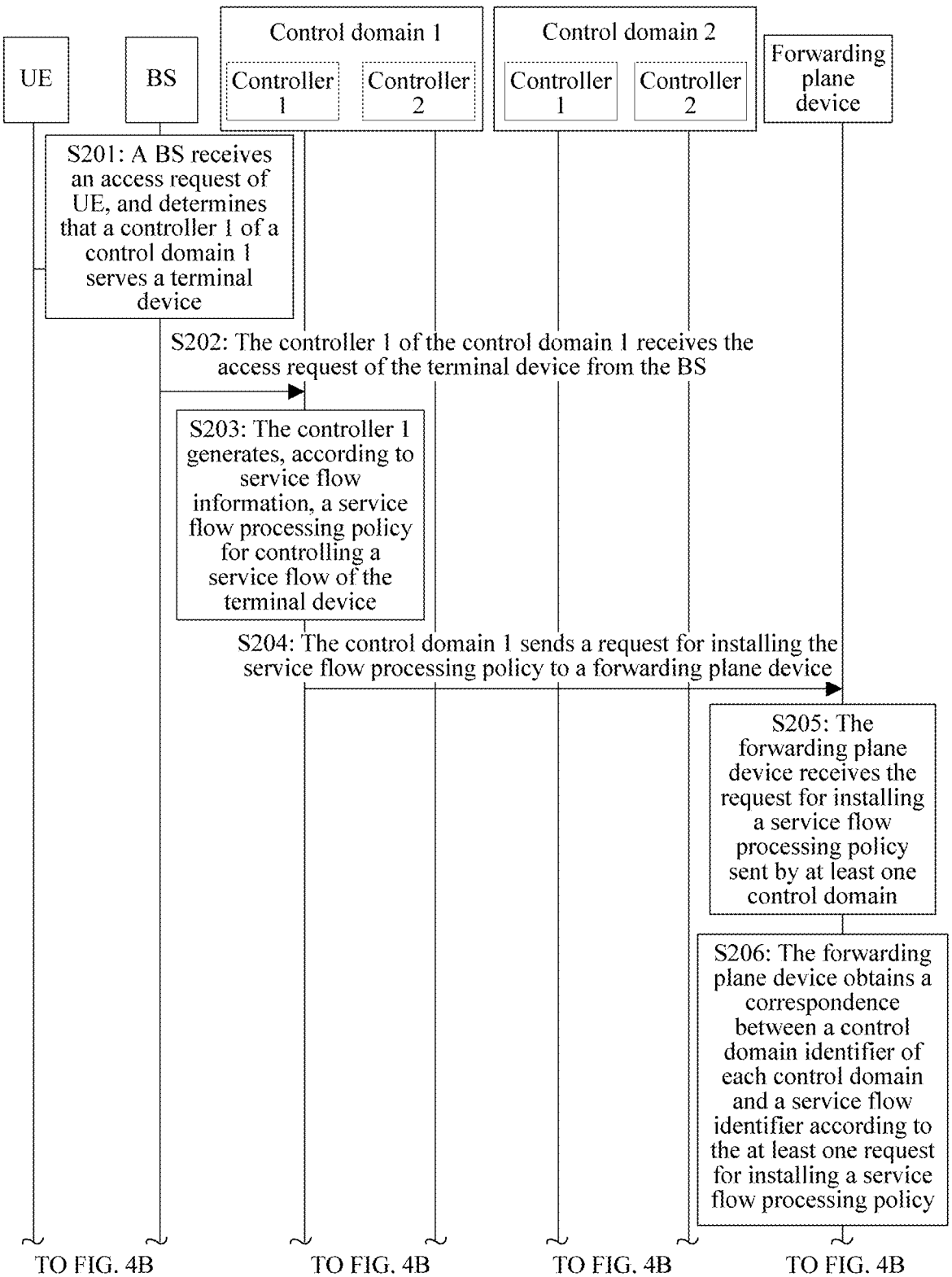
FIG. 4A and FIG. 4B are an interaction flowchart of Embodiment 2 of a processing method for a service flow processing policy according to the embodiments of the present disclosure.
Figure 4B:
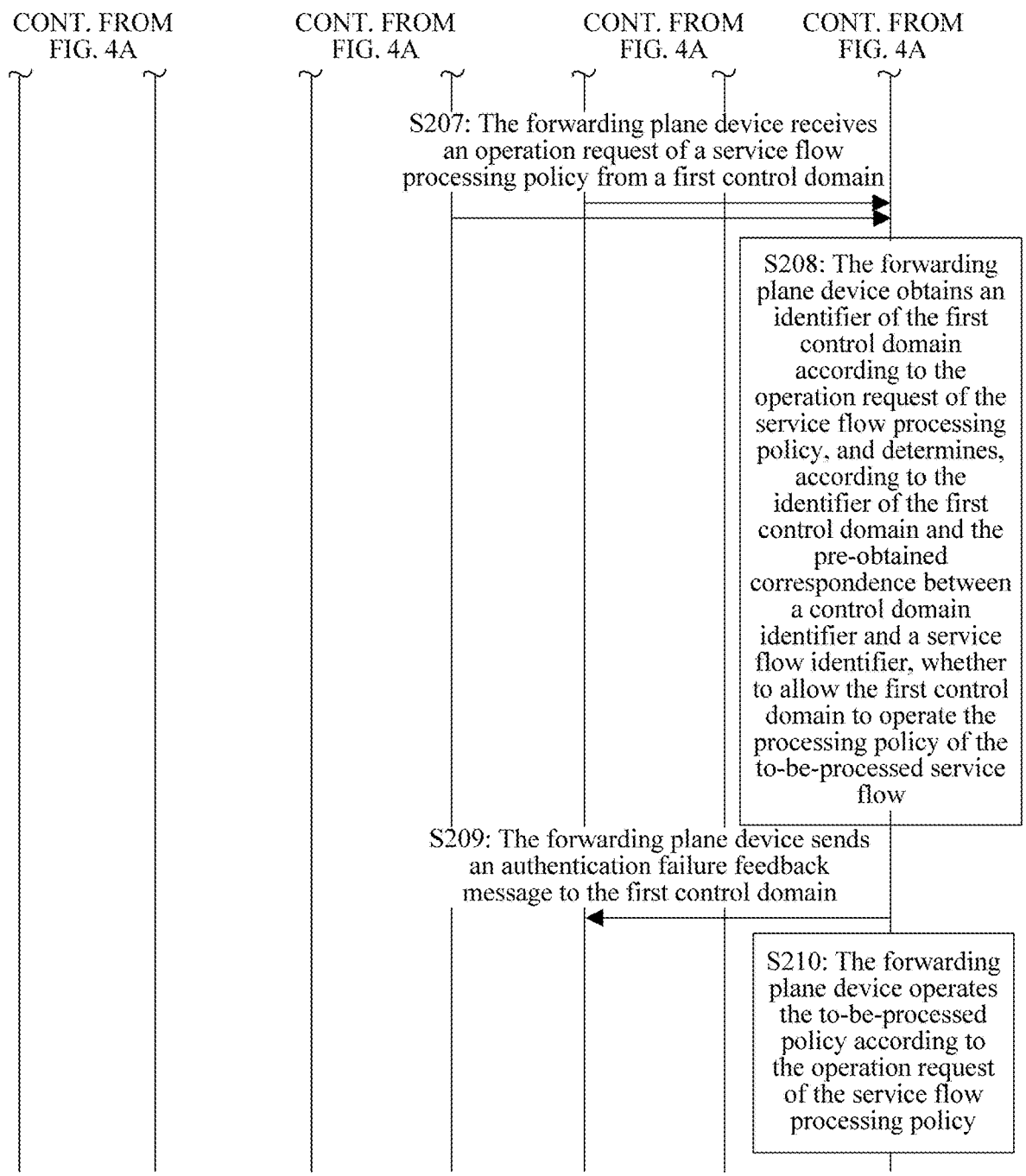

FIG. 4A and FIG. 4B are an interaction flowchart of Embodiment 2 of a processing method for a service flow processing policy according to the embodiments of the present disclosure. As shown in FIG. 4A and FIG. 4B, a detailed implementation process of this solution in this embodiment is as follows:

S201: ABS receives an access request of a user terminal device, and determines that the controller 1 in the control domain 1 serves the terminal device.

In this embodiment, the base station may determine a control domain according to information such as a network topology structure, current load, or a preconfigured policy. A selected control domain may be a single controller, a network slice including one or more controllers, or a controller group including multiple controllers. This is not limited in the present disclosure. In this embodiment, an example in which a controller group is a control domain is used for description.

S202: The controller 1 in the control domain 1 receives the access request of the terminal device from the BS.

The access request herein includes a request from the terminal device when the terminal device accesses a network element for the first time, and also includes a service request or the like. The controller 1 configures and generates service flow information for the terminal device according to information of the terminal device that is carried in the access request, or obtains service flow information from the service request. The service flow information may be service flow identifier information. For example, the identifier information is a packet having a same source IP address and a same destination IP address or a packet having a same IP 5-tuple or conforming to a particular header field rule. When a tunnel protocol is used, the identifier information may alternatively be user bearer information.

Step S201 and S202 are only a manner of obtaining the service flow information of the terminal device. The solution of the present disclosure is not limited to this manner.

S203: The controller 1 generates, according to service flow information, a service flow processing policy for controlling a service flow of the terminal device.

In this embodiment, the controller 1 in the control domain 1 generates, according to the access request, the service flow processing policy that is needed to control a service flow of the terminal device.

The controller 1 is equivalent to any controller in Embodiment 1, and may be the first controller or another controller. In a process of installing the service flow processing policy after the terminal device performs initial access, an implementation step is similar.

S204: The control domain 1 sends a request for installing the service flow processing policy to a forwarding plane device.

In this embodiment, the request for installing the service flow processing policy includes the service flow processing policy and a service flow identifier corresponding to the service flow processing policy. That is, parameters carried in the request for installing the service flow processing policy include identifier information corresponding to the service flow of the user, to perform match with a received user packet to determine whether the packet belongs to the service flow. The service flow identifier may be an Internet Protocol (IP) address of the terminal device of the user, or bearer information corresponding to service flow transmission such as an IP address and a tunnel endpoint identifier (TEID) corresponding to a GPRS Tunneling Protocol (GTP) tunnel or an IP 5-tuple of the service flow.

Optionally, the request for installing the service flow processing policy carries an identifier of the control domain 1. When the control domain is a single controller, the identifier of the control domain may be an identifier (ID) of the controller, a MAC address of the controller, or an IP address of the controller. When the control domain is a control plane corresponding to a network slice or a controller group, the identifier of the control domain may be a slice ID or a group ID.

The first controller in the foregoing embodiment is used as an example. S202 to S204 may be summarized as follows: The first controller receives the access request of the terminal device from the base station; the first controller obtains the service flow information of the terminal device according to the access request; the first controller generates, according to the service flow information, a processing policy for controlling the service flow of the terminal device; and the first controller sends the request for installing the service flow processing policy to the forwarding plane device. The request for installing the service flow processing policy includes the service flow processing policy and the service flow identifier corresponding to the service flow processing policy.

S205: The forwarding plane device receives the request for installing a service flow processing policy from at least one control domain.

That is, the forwarding plane device receives requests for installing a service flow processing policy from controllers in multiple control domains.

S206: The forwarding plane device obtains a correspondence between a control domain identifier of each control domain and a service flow identifier according to the at least one request for installing a service flow processing policy.

In this embodiment, the request for installing the service flow processing policy from the control domain (or a controller in the control domain) includes the service flow processing policy and the service flow identifier corresponding to the service flow processing policy. That is, after the forwarding plane device receives the request for installing the service flow processing policy, the forwarding plane device obtains the identifier of the control domain 1 and information about the service flow identifier, and records an association between the identifier of the control domain 1 and the service flow. The obtaining, by the forwarding plane device, the identifier of the control domain 1 may be: obtaining, from a received installation message, the identifier of the control domain 1 that is carried in the received installation message; using control connection information such as a peer-end IP and/or a peer-end port number for connection control as the identifier; using a control session identifier corresponding to the operation request of the service flow processing policy as an identifier of the first control domain; or using an identifier of a network slice corresponding to the operation request of the service flow processing policy as the identifier of the first control domain.

Step S201 to step S206 described above are all general processes. Before the forwarding plane device processes the service flow, the forwarding plane device needs to complete installation of the service flow processing policy according to the foregoing steps. The forwarding plane device provided in this solution can record a correspondence between a control domain and a service flow. Subsequent steps are processes of processing a service flow processing policy when an application of any control domain (or a controller in any control domain) is received.

S207: The forwarding plane device receives an operation request of a service flow processing policy from a first control domain.

In this embodiment, the first control domain is the control domain 1. During specific implementation, the controller 2 in the control domain 1 or any controller in the control domain 2 may send the operation request of the service flow processing policy.

S208: The forwarding plane device obtains an identifier of the first control domain according to the operation request of the service flow processing policy, and determines, according to the identifier of the first control domain and the pre-obtained correspondence between a control domain identifier and a service flow identifier, whether to allow the first control domain to operate the processing policy of the to-be-processed service flow.

In this embodiment, when the forwarding plane device subsequently receives an operation request of the service flow processing policy (for example, requesting to install, delete, or modify a policy), the forwarding plane device first obtains, according to a received request message, a control domain identifier and the identifier of the service flow that needs to be operated, and obtains a control domain identifier corresponding to information about the service flow identifier and performs authentication on the request message according to the recorded correspondence between a control domain identifier and a service flow identifier. Authentication refers to determining whether a control domain to which a controller sending the request belongs can operate a processing policy corresponding to the service flow.

A common manner is: obtaining, by the forwarding plane device according to the pre-obtained correspondence between a control domain identifier and a service flow identifier, a control domain identifier corresponding to the service flow identifier corresponding to the to-be-processed policy; and determining, by the forwarding plane device, whether the identifier of the first control domain is the same as the control domain identifier corresponding to the service flow identifier corresponding to the to-be-processed policy; and if the identifier of the first control domain is the same as the control domain identifier corresponding to the service flow identifier corresponding to the to-be-processed policy, allowing the first control domain (that is, a controller in the first control domain) to operate the to-be-processed policy; or if the identifier of the first control domain is different from the control domain identifier corresponding to the service flow identifier corresponding to the to-be-processed policy, disallowing the first control domain to operate the to-be-processed policy.

S209: The forwarding plane device sends an authentication failure feedback message to the first control domain.

S210: The forwarding plane device operates a to-be-processed policy according to the operation request of the service flow processing policy.

In this embodiment, if the control domain identifier that is obtained according to a message of the operation request of the service flow processing policy is inconsistent with the recorded control domain identifier corresponding to the service flow identifier, authentication fails. Optionally, the forwarding plane device sends a failure response to the sending party that sends the request message. If the control domain identifier that is obtained according to a request message is consistent with the recorded control domain identifier corresponding to the service flow identifier, authentication succeeds. The forwarding plane device installs, deletes, or modifies the service flow processing policy according to the request message.

Not both S209 and S210 are performed for a same controller, and S209 and S210 are steps that are selected and performed according to an actual case.

In this embodiment, based on an association between a control domain identifier and a user service flow that is recorded by the forwarding plane device, different service flow processing policies of the forwarding plane device are isolated from different control domains. As shown in Embodiment 1, a controller in the control domain 1 can manage and control the current service flow processing policy, but a controller in another control domain such as the control domain 2 has no capability of managing and controlling the service flow processing policy. Therefore, a service flow processing policy of a forwarding plane is isolated from different control domains. This improves security, and avoids that a controller having no management permission operates some service flow processing policies, and consequently data is processed incorrectly or stolen.

When a control plane, that is, a controller in a control domain, cannot normally communicate with the forwarding plane device, for example, the controller is powered off or restarted abnormally or a control link encounters a fault, the forwarding plane device may process in batches service flow processing policies managed by the controller. Being incapable of normally performing communication herein includes the following several cases: a controller that is in a control domain and that manages some service flow processing policies cannot communicate with the forwarding plane device, or all controllers in a control domain cannot normally communicate with the forwarding plane device. The control domain may include only one controller, or may include multiple controllers.

Figure 5:
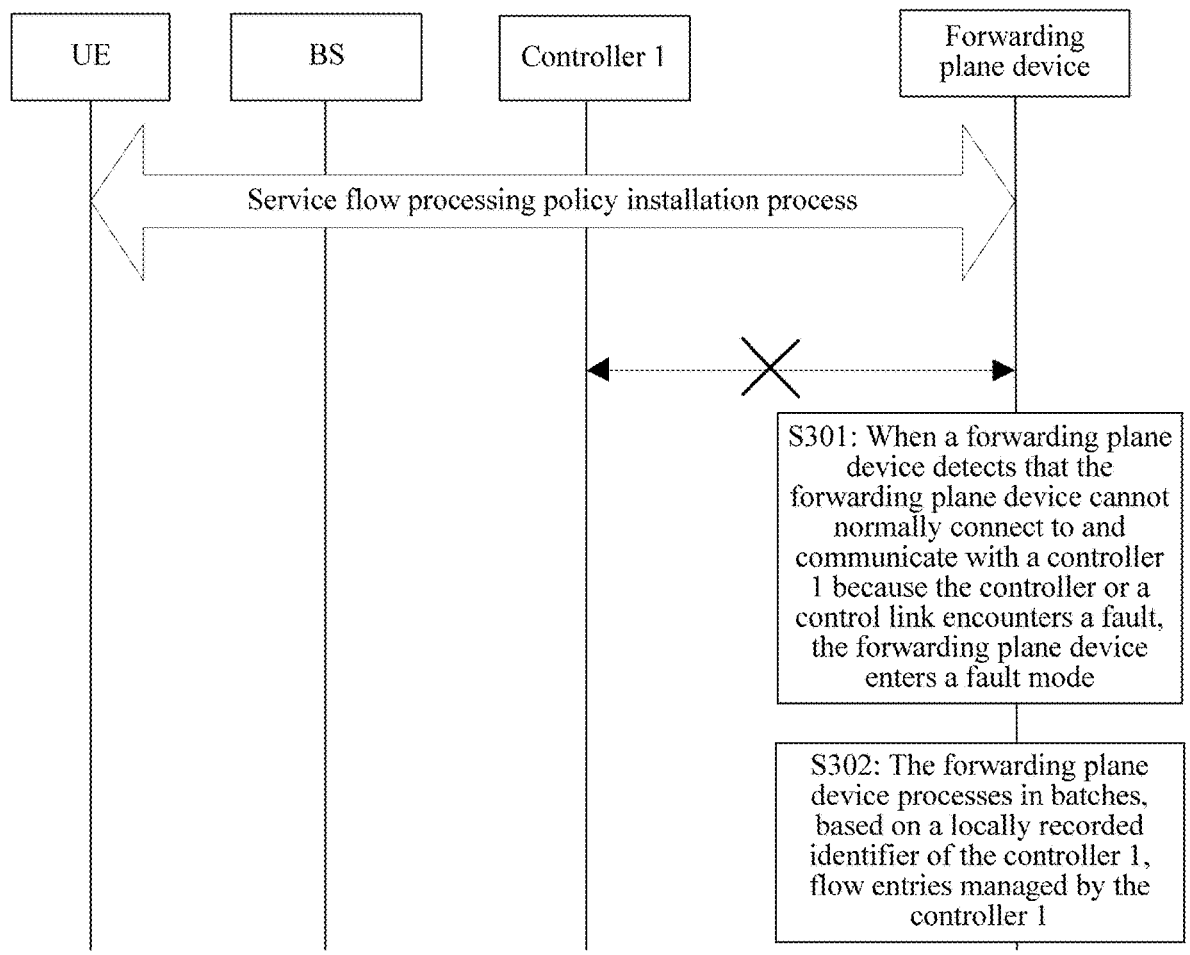
FIG. 5 is an interaction flowchart of Embodiment 3 of a processing method for a service flow processing policy according to the embodiments of the present disclosure.

FIG. 5 is an interaction flowchart of Embodiment 3 of a processing method for a service flow processing policy according to the embodiments of the present disclosure. As shown in FIG. 5, this embodiment provides an implementation in which a forwarding plane device processes in batches service flow processing policies managed by a controller that cannot normally perform communication. Specific steps are as follows:

First, similar to step S201 to step S206 in the embodiment shown in FIG. 4A and FIG. 4B, a forwarding plane device needs to install a related processing policy after a terminal device performs access, and the controller 1 provides an access control service for terminal devices of multiple users. When the terminal device accesses a network by using different access network elements or a same access network element, the controller 1 generates a corresponding service flow processing policy for the terminal device, and delivers the policy to the forwarding plane device. The forwarding plane device obtains and records an association between the identifier of the controller 1 and each service flow.

For example, when a control protocol is an OpenFlow protocol, a forwarder stores a service flow processing policy in a form of a flow entry. A form of each flow entry is as follows:

Match Fields→Instruction Set, Ctrl ID, where

Match Fields records packet header field characteristic information such as a source/destination IP address for performing matching with a service flow; Instruction Set records a processing action that needs to be performed on a service flow, where the processing action includes modification, forwarding, and the like; and Ctrl ID is the identifier of the controller 1 such as an IP address or a MAC address of the controller 1.

S301: When a forwarding plane device detects that the forwarding plane device cannot normally connect to and communicate with the controller 1 because the controller or a control link encounters a fault, the forwarding plane device enters a fault mode.

In this embodiment, the forwarding plane device may detect, by detecting whether a TCP link is disconnected or by sending a heartbeat detection packet, whether communication cannot be performed normally. This is not limited in the present disclosure.

S302: The forwarding plane device processes in batches, based on a locally recorded identifier of the controller 1, flow entries managed by the controller 1.

In this embodiment, the operation of processing in batches may be: setting service flow processing policies managed by the controller 1 to an idle state, or deleting service flow processing policies (flow entries) managed by the controller 1.

Actually, if the forwarding plane device detects that communication with the first control domain cannot be normally performed, the forwarding plane device suspends, according to a control domain identifier corresponding to a service flow processing policy, executing all service flow processing policies corresponding to the first control domain, or deletes all service flow processing policies corresponding to the first control domain.

The control domain may be one controller, a controller group including, for example, multiple controllers, or a control plane corresponding to a network slice. That is, after communication cannot be performed normally on a link between the control domain and the forwarding plane device, the forwarding plane device processes in batches flow entries managed by the control domain.

According to the service flow processing policy processing method provided in this embodiment, after the forwarding plane device detects that a link between a control domain and the forwarding plane device is disconnected, the forwarding plane device processes in batches, based on a recorded association between a control domain identifier and a service flow, processing policies managed by the control domain. This avoids an operation of a controller having no permission, and improves accuracy and security.

Figure 6:
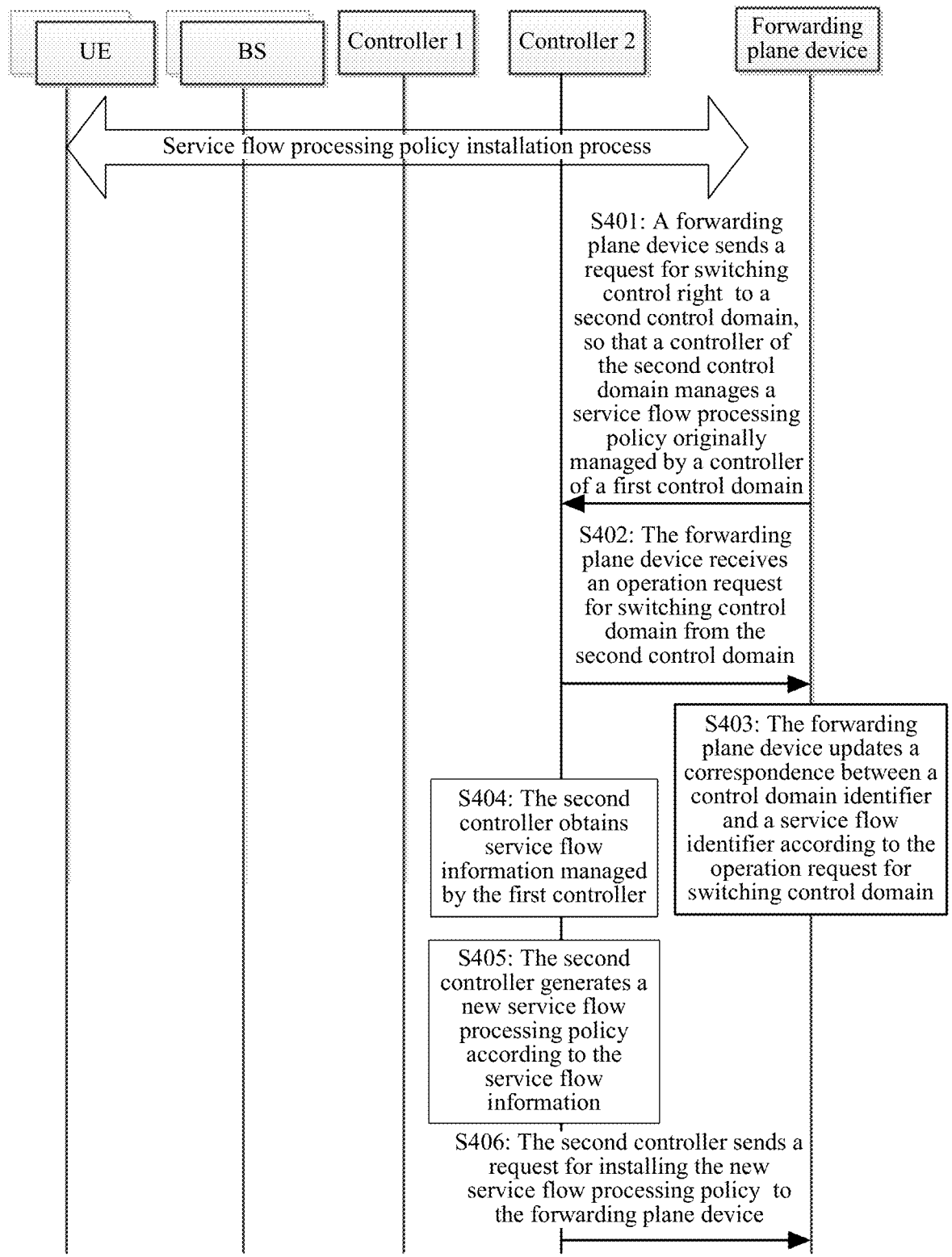
FIG. 6 is an interaction flowchart of Embodiment 4 of a processing method for a service flow processing policy according to the embodiments of the present disclosure.

FIG. 6 is an interaction flowchart of Embodiment 4 of a processing method for a service flow processing policy according to the embodiments of the present disclosure. As shown in FIG. 6, when a forwarding plane device cannot normally communicate with the controller 1 or a forwarding plane device needs to switch to another control domain to manage some service flow processing policies, the forwarding plane device may initiate, to the control domain, control domain control right switching, and the control domain 2 takes over a service flow processing policy managed by the control domain 1. That is, the controller 1 is switched to the controller 2 in the control domain 2 to manage a service flow managed by the controller 1. In this implementation, the controller 1 and the controller 2 generally belong to different control domains. However, the present disclosure is not limited thereto. Specific steps of this solution are as follows:

First, similar to step S201 to step S206 in the embodiment shown in FIG. 4A and FIG. 4B, the forwarding plane device needs to install a related processing policy when a user accesses a network. The controller 1 and the controller 2 separately generate service flow processing policies for corresponding users, and deliver the policies to the forwarding plane device. The forwarding plane device obtains and records an association between an identifier of the controller 1 and a corresponding service flow and an association between an identifier of the controller 2 and a corresponding service flow, or a relationship between an identifier of a control domain to which a controller belongs and a service flow, and establishes a communication connection with the forwarding plane device.

S401: A forwarding plane device sends a request for switching control right to a second control domain, so that a controller of the second control domain manages a service flow processing policy originally managed by a first control domain.

In this embodiment, the request for switching control right includes an identifier of the first control domain. The request for switching control right instructs the control domain 2 to take over a user service flow managed by the control domain 1. Optionally, the request for switching control right carries a service flow identifier.

During specific implementation, if the forwarding plane device detects that the forwarding plane device cannot normally establish a communication connection to the control domain 1 when the controller 1 or a link between the control domain 1 and the forwarding plane device encounters a fault, the forwarding plane device may initiate the request for switching control right. The detection may be performed by detecting whether a TCP link is disconnected or by sending a heartbeat detection packet. This is not limited in the present disclosure.

The controller 1 is equivalent to the first controller in the first control domain in the embodiment shown in FIG. 3. The controller 2 may be any controller in the second control domain, and is referred to as, for example, a second controller. Therefore, the essence of the foregoing step is: sending, by the forwarding plane device, the request for switching control right to the second control domain, so that the controller of the second control domain manages a service flow processing policy originally managed by the controller of the first control domain, where the second control domain is any control domain other than the first control domain, and the request for switching control right includes the identifier of the first control domain.

During specific implementation, the forwarding plane device sends the request for switching control right to the second controller in the second control domain, so that the second controller manages a service flow processing policy originally managed by the first controller. The second controller is determined by the second control domain according to a load status of each controller in the second control domain and a preconfigured policy.

Optionally, initiation of control right switching is not limited to initiation by the forwarding plane device. Alternatively, the first control domain may initiate control right switching. In this embodiment, the forwarding plane device initiates switching of a management right from the first control domain to the second control domain. During specific implementation, an operation may be performed for a controller, and switching of a management right is initiated from the first controller in the first control domain to the second controller in the second control domain. For details, refer to subsequent steps.

S402: The forwarding plane device receives an operation request for switching control domain from the second control domain.

S403: The forwarding plane device updates a correspondence between a control domain identifier and a service flow identifier according to the operation request for switching control domain.

After control right switching initiated by the forwarding plane device is accepted by the second control domain, the second control domain returns the operation request for switching control domain to notify the forwarding plane device that switching can be performed. The forwarding plane device updates a locally stored correspondence between a control domain identifier and a service flow identifier according to the operation request for switching control domain. This indicates the following meaning: if management of all service flow processing policies originally managed by the first control domain is switched to the second control domain, control domain identifiers corresponding to identifiers of all service flows originally managed by the first control domain are changed to an identifier of the second control domain. If switching is performed for some service flows, control domain identifiers corresponding to identifiers of only the service flows for which switching is performed are changed to an identifier of the second control domain.

Optionally, regardless of whether the first control domain, the first controller, or the forwarding plane device initiates control right switching, after a device to which switching is performed (for example, the second controller) determines that switching can be performed, the device to which switching is performed needs to send the operation request for switching control domain to the forwarding plane device, to instruct the forwarding plane device to update the correspondence between the control domain identifier and the service flow identifier, thereby completing control domain management right switching.

Subsequent steps are optional steps. The first controller in the first control domain and the second controller in the second control domain are used as an example subsequently. Details are specifically as follows:

S404: The second controller obtains service flow information managed by the first controller.

With reference to the embodiment, this step indicates that the controller 2 obtains the service flow information managed by the controller 1. This is equivalent to that the second control domain obtains service flow information of a service flow originally managed by the first control domain.

In this embodiment, after the controller 2 receives the request for switching control right from the forwarding plane device, the controller 2 obtains, according to request information in the request for switching control right, the service flow information of the service flow managed by the controller 1. Specifically, an obtaining manner includes at least the following:

In a first implementation, the forwarding plane device sends a request for switching control right to the second control domain, where the request for switching control right includes the identifier and service flow information of the first control domain, and the service flow information includes one or more service flow identifiers corresponding to the first control domain.

In a second implementation, when a network architecture includes a centralized database that stores the service flow information (also referred to as the service flow context information), the service flow context information includes a service flow identifier, a processing rule related to a service flow of a user, an international mobile subscriber identification number (IMSI) of the user, a user equipment aggregate maximum bit rate (UE AMBR), and the like. When a tunnel protocol is used, the service flow context information may alternatively include user bearer information. The controller 2 obtains, from the database, the user service flow context information that is managed by the controller 1. The controller 2 sends a query request to the database. The database sends the service flow information managed by the controller 1 to the controller 2 according to the received query request. The query request carries at least the identifier of the controller 1.

In a third implementation, when a network architecture includes no centralized database that stores the service flow information of a user, after the controller 2 receives the request for switching control right from the forwarding plane device, the controller 2 responds to the forwarding plane device according to a load status of the controller 2, and sends the operation request for switching control domain. The operation request for switching control domain carries a parameter for requesting to obtain service flow information managed by the controller 1. Optionally, the operation request for switching control domain may further carry identifier information of the controller 1.

Specifically, this implementation may be described as follows: A request for obtaining service flow information is used as a parameter and is included in the operation request for switching control domain message, and the forwarding plane device correspondingly processes a recorded association between the identifier of the controller 1 and each service flow according to the received control domain switching operation request, and replies with a response message to the controller 2. The response message carries the service flow information of the service flow managed by the controller 1.

In a fourth implementation, the control plane device receives a request for obtaining service flow information from the second control domain; and the control plane device returns service flow information to the second control domain, where the service flow information includes one or more service flow identifiers corresponding to the first control domain.

In a fifth implementation, the controller 2 directly obtains the service flow information from the controller 1. The controller 2 may directly send a request for obtaining service flow information to the controller 1. Optionally, the request for obtaining service flow information carries authorization information. The controller 1 returns the service flow information managed by the controller 1 to the controller 2.

With reference to the embodiment shown in FIG. 3, when the second controller is an executing body, the technical essence summarized according to the foregoing manners is as follows: The obtaining, by the second controller, the service flow information managed by the first controller specifically includes:

receiving, by the second controller, the request for switching control right from the forwarding plane device, where the request for switching control right includes the service flow information; or querying, by the second controller, a database to obtain the service flow information managed by the first controller; or sending, by the second controller, the operation request for switching control domain to the forwarding plane device, where the operation request for switching control domain carries a parameter for requesting to obtain the service flow information; and receiving, by the second controller, the service flow information from a forwarding plane; or sending, by the second controller, a request for obtaining the service flow information to the forwarding plane device; and receiving, by the second controller, the service flow information from the forwarding plane device, where the service flow information includes one or more service flow identifiers corresponding to a first control domain; or sending, by the second controller, a request for obtaining the service flow information to the first controller; and receiving, by the second controller, the service flow information from the first controller.

S405: The second controller generates a new service flow processing policy according to the service flow information.

In this embodiment, the controller 2 generates a new service flow processing policy according to the received service flow information managed by the controller 1.

S406: The second controller sends a request for installing the new service flow processing policy to the forwarding plane device.

The request for installing the new service flow processing policy includes the new service flow processing policy.

The controller 2 sends the request for installing the new service flow processing policy (for example, requesting to install, delete, or modify the policy) to the forwarding plane device. The request for installing the new service flow processing policy is used to operate a processing policy corresponding to each user service flow managed by the controller 1.

That is, the forwarding plane device receives a request for installing a new service flow processing policy from the second control domain, where the request for installing the new service flow processing policy includes the new service flow processing policy, and the new service flow processing policy is generated by the second control domain according to service flow information of a service flow corresponding to the first control domain.

Step S405 and step S406 are optional and may not be performed. That is, the second control domain may not generate the new service flow processing policy for the forwarding plane device.

A process on a side of the second controller is summarized as follows: The second controller receives the request for switching control right, where the request for switching control right is used to instruct the second controller to manage the service flow processing policy originally managed by the first controller; the second controller sends the operation request for switching control domain to the forwarding plane device to instruct the forwarding plane device to update the correspondence between the control domain identifier and the service flow identifier; the second controller obtains the service flow information managed by the first controller; and the second controller generates the new service flow processing policy according to the service flow information, and sends the request for installing the new service flow processing policy to the forwarding plane device. The request for installing the new service flow processing policy includes the new service flow processing policy. Optionally, the request for installing the new service flow processing policy may alternatively include the identifier of the second controller.

In addition, in this embodiment, assuming that there are n controllers: a controller 1, a controller 2, . . . , and a controller n, a specific procedure is as follows: the forwarding plane device sends the request for switching control right to the controller 2, the controller 3, . . . , and the controller n according to controller identifiers recorded in flow entries; after the controller 2, the controller 3, . . . , and the controller n receive the request for switching control right, the controller 2, the controller 3, . . . , and the controller n negotiate with each other; the controller 2 takes over a control right of the controller 1, or multiple controllers may take over a control right of the controller 1. The negotiation may be based on a preconfigured policy, a network topology structure, a load status of a controller, and the like.

When multiple controllers take over the control right of the controller 1, for example, the controller 2 and the controller 3 jointly take over the control right of the controller 1. First, after the controller 2 and the controller 3 receive the request for switching control right from the forwarding plane network element, the controller 2 and the controller 3 separately send the operation request for switching control domain to the forwarding plane device, to separately instruct the forwarding plane device to update the correspondence between the identifier of the controller 1 and the service flow to a correspondence between the controller 2 and the corresponding service flow and a correspondence between the controller 3 and the corresponding service flow. The request for switching control right from the forwarding plane network element includes the identifier of the controller 1 and the identifier of the corresponding service flow managed by the controller 1. Optionally, the controller 2 and the controller 3 generate new service flow processing policies based on a corresponding service flow identifier, and send the new service flow processing policies to the forwarding plane device.

According to the service flow processing policy processing method provided in this embodiment, the forwarding plane device initiates control right switching to another control domain based on a recorded association between a controller identifier and a service flow, to process in batches service flow processing policies managed by the control domain. This avoids that a processing policy is not updated in time because a link between a control domain and the forwarding plane device is disconnected, or avoids other security problems.

Figure 7:
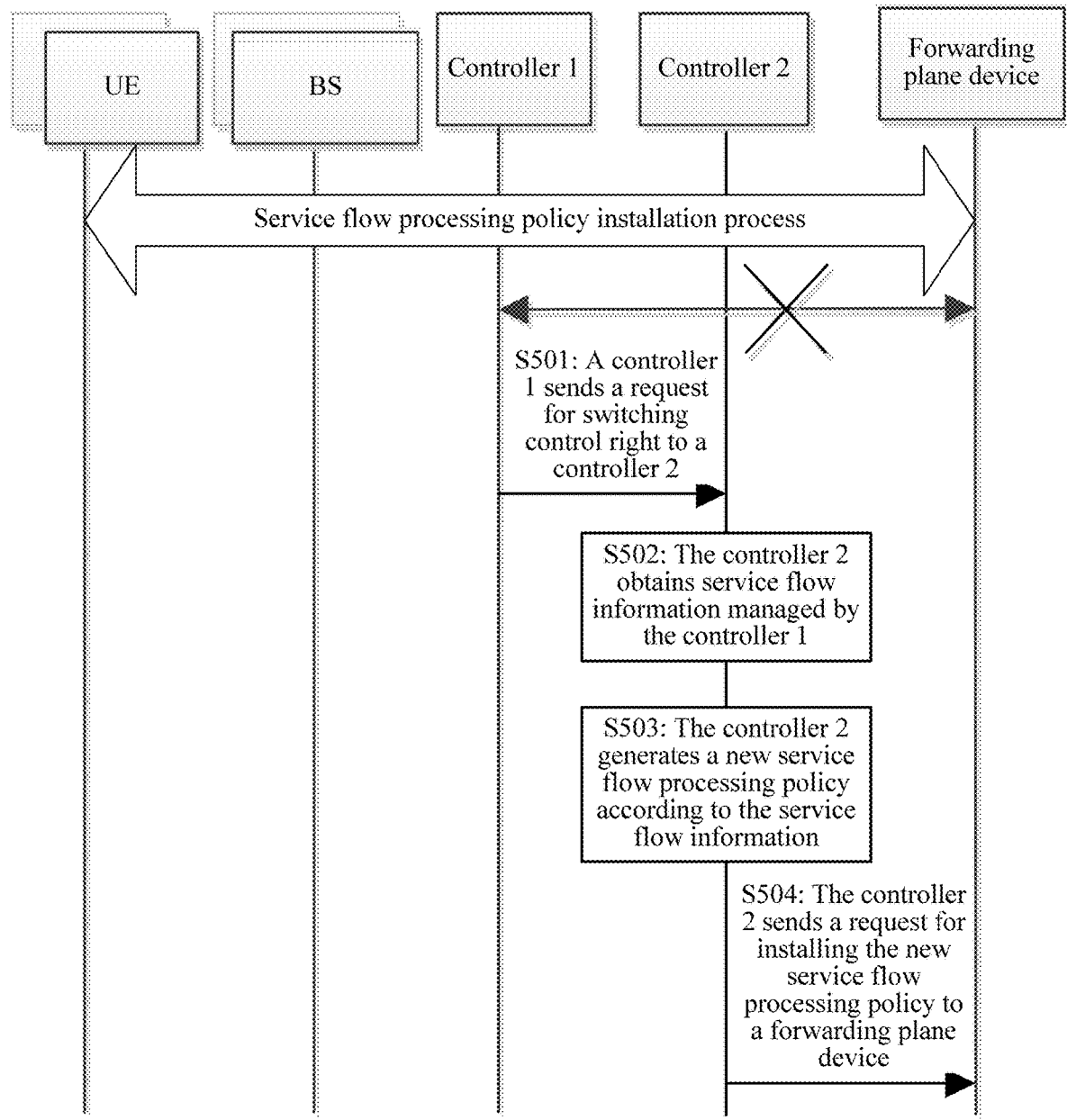
FIG. 7 is an interaction flowchart of Embodiment 5 of a processing method for a service flow processing policy according to the embodiments of the present disclosure.

FIG. 7 is an interaction flowchart of Embodiment 5 of a processing method for a service flow processing policy according to the embodiments of the present disclosure. As shown in FIG. 7, a controller 1 actively initiates switching of a control right of the controller 1 to a controller 2. The controller 2 takes over a service flow processing policy managed by the controller 1. In this implementation, the controller 1 and the controller 2 generally belong to different control domains. However, the present disclosure is not limited thereto. Specific steps of this solution are as follows:

First, similar to step S201 to step S206 in the embodiment shown in FIG. 4A and FIG. 4B, the forwarding plane device needs to install a related processing policy after a terminal device performs access. The controller 1 and the controller 2 separately generate service flow processing policies for corresponding terminal devices, and deliver the policies to the forwarding plane device. The forwarding plane device obtains and records an association between an identifier of the controller 1 and a corresponding service flow and an association between an identifier of the controller 2 and a corresponding service flow, or a relationship between an identifier of a control domain to which a controller belongs and a service flow, and establishes a communication connection with the forwarding plane device.

S501: The controller 1 sends a request for switching control right to the controller 2.

In this embodiment, the controller 1 may detect that the controller 1 cannot normally communicate with the forwarding plane device because of another reason, and send the request for switching control right to the controller 2. The request for switching control right includes an identifier of the controller 1, and optionally includes authorization information of the controller 1. The authorization information of the controller 1 may be a token that is generated by the controller 1 by performing encryption according to a certificate or a key of the controller 1, so that when the forwarding plane device receives the authorization information, the forwarding plane device may verify, according to public key information of the controller 1, that the token is authorization information generated by the controller 1.

That is, the first controller sends the request for switching control right to the second controller, where the request for switching control right includes an identifier of a first control domain.

Optionally, the request for switching control right further includes authorization information. The second controller is determined by a second control domain according to a load status of each controller in the second control domain and a preconfigured policy.

The second controller (that is, the controller 2) accepts the request for switching control right, and sends an operation request for switching control domain to the forwarding plane device, to instruct the forwarding plane device to update a correspondence between a control domain identifier and a service flow identifier. After control right switching is completed, optionally, the method may further include subsequent steps.

S502: The controller 2 obtains service flow information managed by the controller 1.

In this embodiment, after the controller 2 receives the request for switching control right from the controller 1, the controller 2 obtains, according to request information in the request for switching control right, the service flow information of the service flow managed by the controller 1. The service flow information may alternatively be referred to as service flow context information. Specifically, an obtaining manner includes at least the following:

In a first implementation, the controller 2 receives the request for switching control right from the controller 1. When the request for switching control right includes the service flow context information managed by the controller 1, the controller 2 obtains, from the request for switching control right, the service flow context information managed by the controller 1.

In a second implementation, when a network architecture includes a centralized database that stores service flow context information, the service flow information (also referred to as the service flow context information) includes a service flow identifier and a processing rule related to a service flow of a user, and may be an IMSI of the user, a UE AMBR, and the like. When a tunnel protocol is used, the service flow context information may alternatively be bearer information of a terminal device. The controller 2 obtains, from the database, user context, that is, the service flow information that is managed by the controller 1. The controller 2 sends a query request to the database. The database sends the service flow information managed by the controller 1 to the controller 2 according to the received query request. The query request carries at least the identifier of the controller 1.

In a third implementation, the controller 2 directly obtains the service flow information from the controller 1. The controller 2 may directly send an obtaining request to the controller 1. Optionally, the obtaining request may carry authorization information. The controller 1 returns the service flow information managed by the controller 1 to the controller 2.

Details may be as follows: The first controller sends the service flow information managed by the first controller to the second controller, so that the second controller generates a new processing policy according to the service flow information. Alternatively, the first controller receives a request for obtaining the service flow information from the second controller; and the first controller sends the service flow information managed by the first controller to the second controller, so that the second controller generates a new processing policy according to the service flow information.

In a fourth implementation, when a network architecture includes no centralized database that stores the service flow context information of a user, after the controller 2 receives the request for switching control right from the controller 1, the controller 2 responds to the controller 1 according to a load status of the controller 2, and sends the operation request for switching control domain. The operation request for switching control domain carries a parameter for requesting to obtain the service flow information of the controller 1, and may carry an operation performed on a processing policy. Optionally, the operation request for switching control domain may further carry identifier information of the controller 1 and authorization information of the controller 1. After the forwarding plane receives the operation request for switching control domain, the forwarding plane updates the correspondence between the controller 1 and the service flow identifier. The forwarding plane may change an association between the controller 1 and each service flow that is recorded by the forwarding plane device to an association between the controller 2 and each service flow, sets an association between the controller 1 and each service flow that is recorded by the forwarding plane device to an idle state, or deletes an association between the controller 1 and each service flow that is recorded by the forwarding plane device.

Specifically, this implementation may be described as follows: A request for obtaining service flow information is used as a parameter and is included in the operation request for switching control domain message, and the forwarding plane device correspondingly processes a recorded association between the identifier of the controller 1 and each service flow according to the received control domain switching operation request, and replies with a response message to the controller 2. The response message carries the service flow information of the service flow managed by the controller 1.

With reference to the embodiment shown in FIG. 3, the technical essence summarized according to the foregoing manners is as follows: The second controller receives the request for switching control right from the first controller, where the request for switching control right includes user service flow information managed by the first controller; or querying, by the second controller, a database to obtain the service flow information managed by the first controller; or sending, by the second controller, an operation request for switching control domain to the forwarding plane device, where the operation request for switching control domain carries a parameter for requesting to obtain the service flow information; and receiving, by the second controller, the service flow information managed by the first controller from the forwarding plane device, where the operation request for switching control domain includes the identifier of the first controller, and optionally further includes the identifier of the service flow managed by the first controller; or sending, by the second controller, a request for obtaining the service flow information to the first controller; and receiving, by the second controller, the service flow information from the first controller.

S503: The controller 2 generates a new service flow processing policy according to the service flow information.

In this embodiment, the controller 2 generates a new service flow processing policy according to the received service flow information managed by the controller 1. That is, the second controller generates the new service flow processing policy according to the service flow information originally managed by the first controller.

S504: The controller 2 sends a request for installing the new service flow processing policy to a forwarding plane device.

The controller 2 sends the request for installing a new service flow processing policy (for example, requesting to install, delete, or modify the policy) to the forwarding plane device. The request for installing a new service flow processing policy is used to operate a processing policy corresponding to each user service flow managed by the controller 1.

That is, the forwarding plane device receives the request for installing a new service flow processing policy from the second controller in the second control domain, where the request for installing a new service flow processing policy includes a new service flow processing policy, and the new service flow processing policy is generated by the second controller in the second control domain according to service flow information managed by the first control domain. Optionally, the request for installing a new service flow processing policy may alternatively include the identifier of the second control domain.

Step S503 and step S504 are optional. That is, the controller 2 may not generate the new service flow processing policy for the forwarding plane device.

In addition, in this embodiment, a quantity of controllers that have a capability of controlling the forwarding plane device is not limited to two, and may be two or more. Assuming that there are n controllers: a controller 1, a controller 2, . . . , and a controller n sequentially, a specific procedure is described as follows: The controller 1 determines that the controller 2 continues to serve a user managed by the controller 1, or may determine that the controller 2, the controller 3, and the like continue to serve a user managed by the controller 1. That is, the controller 1 may determine that multiple other controllers continue to serve the user managed by the controller 1. Details are not limited. A determining process may be executed according to a preconfigured policy, a network topology structure, a load status of each controller, and the like. For example, the controller 2 and the controller 3 jointly take over user service flow context information managed by the controller 1. First, the controller 2 and the controller 3 separately receive a request for switching control right message from the controller 1, where the request for switching control right message includes an identifier of the controller 1 and an identifier of a corresponding service flow managed by the controller 1. Optionally, the controller 2 and the controller 3 obtain corresponding service flow context information from the controller 1 or a database, generate a corresponding new service flow processing policy according to the corresponding service flow context information, and send the corresponding new service flow processing policy to a forwarding plane network element, to process in batches user service flow processing policies managed by the controller 1.

Optionally, when multiple controllers jointly take over the service flow processing policy managed by the controller 1, the request for switching control right further includes a service flow identifier, so that each controller separately obtains service flow information (that is, service flow context information) according to a corresponding service flow identifier.

According to the service flow processing policy processing method provided in this embodiment, a controller initiates switching of a control right from the controller to the controller 2 of another control domain, to process in batches service flows managed by the controller. As the control right is switched from the controller to the other controller, this avoids that a processing policy is not updated in time because a link between an original controller and the forwarding plane device is disconnected, or avoids other security problems.

A main technical point of the service flow processing policy processing methods provided in Embodiment 1 to Embodiment 5 of the present disclosure is: a forwarding plane network element records an association between a control domain identifier and a service flow of a user terminal device. Based on the association between a control domain identifier and a service flow of a terminal device that is recorded by the forwarding plane network element, different control domains are isolated from a service flow control function, and service flows are migrated between multiple control domains and processed in batches.

Figure 8:
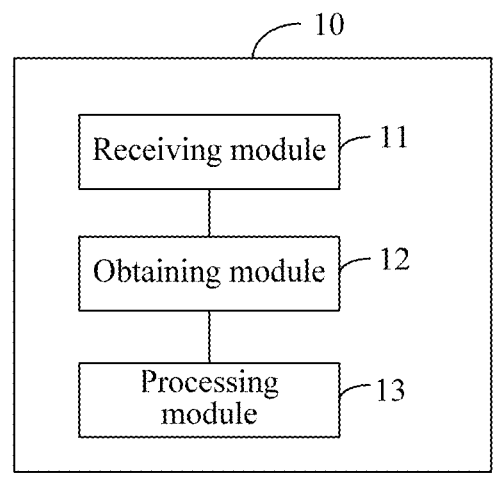
FIG. 8 is a schematic structural diagram of Embodiment 1 of a processing apparatus for a service flow processing policy according to the embodiments of the present disclosure.

FIG. 8 is a schematic structural diagram of Embodiment 1 of a processing apparatus for a service flow processing policy according to the embodiments of the present disclosure. As shown in FIG. 8, the service flow processing policy processing apparatus 10 includes: a receiving module 11, an obtaining module 12, and a processing module 13, where the receiving module 11 is configured to receive an operation request of a service flow processing policy from a first control domain, where the operation request of the service flow processing policy includes a service flow identifier corresponding to a to-be-processed policy;

the obtaining module 12 is configured to obtain an identifier of the first control domain according to the operation request of the service flow processing policy; and the processing module 13 is configured to determine, according to the identifier of the first control domain and a pre-obtained correspondence between a control domain identifier and a service flow identifier, whether to allow the first control domain to operate the to-be-processed policy, where the processing module 13 is further configured to: if determining to allow the first control domain to operate the to-be-processed policy, operate the to-be-processed policy according to the operation request of the service flow processing policy.

The service flow processing policy processing apparatus provided in this embodiment is configured to execute the technical solution of the forwarding plane device in the method embodiment in FIG. 2 to FIG. 7. An implementation principle and a technical effect thereof are similar. After the forwarding plane device receives the operation request of the service flow processing policy of a control domain, the forwarding plane device obtains an identifier of the control domain, and determines, according to a correspondence that is between a control domain identifier and a service flow and that is obtained in advance, whether to allow the control domain to operate a to-be-processed policy. If the control domain corresponds to a service flow, the control domain has management permission, and can perform an operation according to the operation request. If the control domain has no management and control capabilities for the to-be-processed policy, the control domain cannot perform an operation. Therefore, the service flow processing policy of a forwarding plane is isolated from different control domains, a controller having no permission is prevented from modifying the service flow processing policy, and a service flow is processed more correctly and securely.

In Embodiment 2 of the service flow processing policy processing apparatus 10, based on Embodiment 1, the processing module 13 is specifically configured to:

obtain, according to the pre-obtained correspondence between a control domain identifier and a service flow identifier, a control domain identifier corresponding to the service flow identifier corresponding to the to-be-processed policy;

determine whether the identifier of the first control domain is the same as the control domain identifier corresponding to the service flow identifier corresponding to the to-be-processed policy; and if the identifier of the first control domain is the same as the control domain identifier corresponding to the service flow identifier corresponding to the to-be-processed policy, allow the first control domain to operate the to-be-processed policy; or if the identifier of the first control domain is different from the control domain identifier corresponding to the service flow identifier corresponding to the to-be-processed policy, disallow the first control domain to operate the to-be-processed policy.

Optionally, the obtaining module 12 is specifically configured to:

obtain the identifier that is of the first control domain and that is carried in the operation request of the service flow processing policy; or use a source Internet Protocol addressor a source port number that is included in the operation request of the service flow processing policy as the identifier of the first control domain; or use a control session identifier corresponding to the operation request of the service flow processing policy as the identifier of the first control domain; or use an identifier of a network slice corresponding to the operation request of the service flow processing policy as the identifier of the first control domain.

Optionally, the receiving module 11 is further configured to receive a request for installing a service flow processing policy from at least one control domain, where a request for installing a service flow processing policy from each control domain includes a service flow processing policy and a service flow identifier corresponding to the service flow processing policy; and the processing module 13 is further configured to obtain a correspondence between each control domain identifier and a service flow identifier according to the at least one request for installing a service flow processing policy.

Optionally, the processing module 13 is further configured to:

if it is detected that communication with each controller in the first control domain cannot be normally performed, suspend, according to a control domain identifier corresponding to a service flow processing policy, executing all service flow processing policies corresponding to the first control domain, or delete all service flow processing policies corresponding to the first control domain.

Optionally, the receiving module 11 is further configured to receive an operation request for switching control domain from a second control domain, where the second control domain is any control domain other than the first control domain; and the processing module 13 is further configured to update the correspondence between a control domain identifier and a service flow identifier according to the operation request for switching control domain.

The service flow processing policy processing apparatus provided in this embodiment is configured to execute the technical solution of the forwarding plane device in the method embodiment in FIG. 2 to FIG. 7. An implementation principle and a technical effect thereof are similar. Details are not described herein again.

Figure 9:
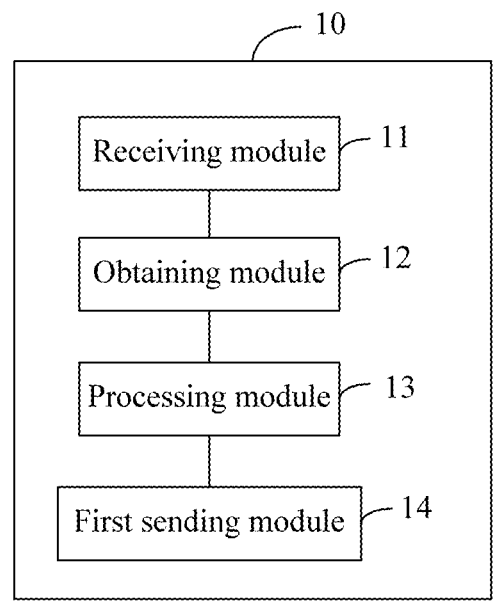
FIG. 9 is a schematic structural diagram of Embodiment 3 of a processing apparatus for a service flow processing policy according to the embodiments of the present disclosure.

FIG. 9 is a schematic structural diagram of Embodiment 3 of a processing apparatus for a service flow processing policy according to the embodiments of the present disclosure. As shown in FIG. 9, the service flow processing policy processing apparatus 10 further includes:

a first sending module 14, configured to send a request for switching control right to the second control domain, so that a controller of the second control domain manages a service flow processing policy originally managed by a controller of the first control domain, where the request for switching control right includes the identifier of the first control domain.

Optionally, the first sending module 14 is specifically configured to:

send the request for switching control right to the second controller of the second control domain, so that the second controller manages the service flow processing policy originally managed by the first controller, where the second controller is determined by the second control domain according to a load status of each controller in the second control domain and a preconfigured policy.

Optionally, the receiving module 11 is further configured to:

receive a request for installing a new service flow processing policy from the second control domain, where the request for installing the new service flow processing policy includes the new service flow processing policy, and the new service flow processing policy is generated by the second control domain according to service flow information of a service flow corresponding to the first control domain.

Optionally, the receiving module 11 is further configured to receive an operation request for switching control domain from the second control domain;

the first sending module 14 is further configured to send the service flow information managed by the first control domain to the second control domain, so that the second control domain generates a new service flow processing policy according to the service flow information; and the receiving module 11 is further configured to receive a request for installing a new service flow processing policy from the second control domain, where the request for installing the new service flow processing policy includes the new service flow processing policy.

The service flow processing policy processing apparatus provided in this embodiment is configured to execute the technical solution of the forwarding plane device in the method embodiment in FIG. 2 to FIG. 7. An implementation principle and a technical effect thereof are similar. Details are not described herein again.

Figure 10:
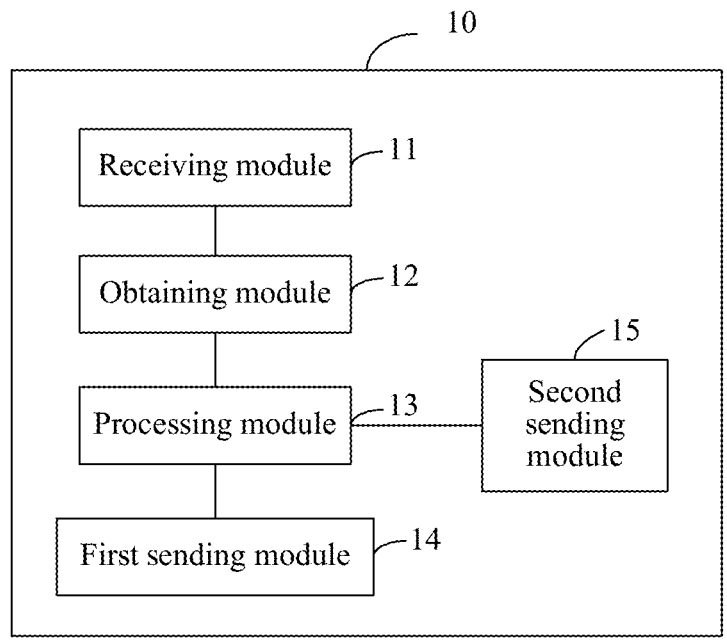
FIG. 10 is a schematic structural diagram of Embodiment 4 of a processing apparatus for a service flow processing policy according to the embodiments of the present disclosure.

FIG. 10 is a schematic structural diagram of Embodiment 4 of a processing apparatus for a service flow processing policy according to the embodiments of the present disclosure. As shown in FIG. 10, based on the foregoing embodiment, the receiving module 11 is further configured to receive an operation request for switching control domain from the second controller of the second control domain;

the service flow processing policy processing apparatus 10 further includes: a second sending module 15; and the second sending module 15 is configured to send a request for switching control right to the second control domain, where the request for switching control right includes the identifier and service flow information of the first control domain, and the service flow information includes one or more service flow identifiers corresponding to the first control domain; or the receiving module 11 is further configured to receive a request for obtaining service flow information from the second control domain; and the second sending module 15 is further configured to send service flow information to the second control domain, where the service flow information includes one or more service flow identifiers corresponding to the first control domain.

The service flow processing policy processing apparatus provided in this embodiment is configured to execute the technical solution of the forwarding plane device in the method embodiment in FIG. 2 to FIG. 7. An implementation principle and a technical effect thereof are similar. Details are not described herein again.

Figure 11:
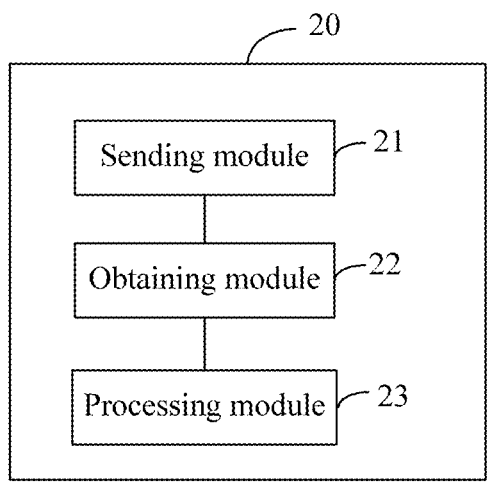
FIG. 11 is a schematic structural diagram of Embodiment 5 of a processing apparatus for a service flow processing policy according to the embodiments of the present disclosure.

FIG. 11 is a schematic structural diagram of Embodiment 5 of a processing apparatus for a service flow processing policy according to the embodiments of the present disclosure. As shown in FIG. 11, the service flow processing policy processing apparatus 20 includes: a sending module 21, an obtaining module 22, and a processing module 23, where the sending module 21 is configured to send an operation request of a service flow processing policy to a forwarding plane device, so that the forwarding plane device determines, according to the operation request of the service flow processing policy and a pre-obtained correspondence between a control domain identifier and a service flow identifier, whether to allow the service flow processing policy processing apparatus to operate a to-be-processed policy; and when a determining result is that the service flow processing policy processing apparatus is allowed to operate the to-be-processed policy, operates the to-be-processed policy according to the operation request of the service flow processing policy, where the operation request of the service flow processing policy includes a service flow identifier corresponding to the to-be-processed policy;

the obtaining module 22 is configured to obtain service flow information of a terminal device; and the processing module 23 is configured to generate, according to the service flow information, the service flow processing policy for controlling a service flow of the terminal device, where the sending module 21 is further configured to send a request for installing the service flow processing policy to the forwarding plane device, where the request for installing the service flow processing policy includes the service flow processing policy and a service flow identifier corresponding to the service flow processing policy.

Optionally, if the processing module 23 detects that communication with the forwarding plane device cannot be performed normally, the sending module is further configured to send a request for switching control right to the second controller, where the request for switching control right includes an identifier of the service flow processing policy processing apparatus.

Optionally, the sending module 21 is further configured to send the service flow information managed by the service flow processing policy processing apparatus to the second controller, so that the second controller generates a new processing policy according to the service flow information; or the obtaining module 22 is further configured to receive a request for obtaining service flow information from the second controller; and the sending module 21 is further configured to send the service flow information managed by the first controller to the second controller, so that the second controller generates a new processing policy according to the service flow information.

The service flow processing policy processing apparatus provided in this embodiment is configured to execute the technical solution of the first controller in the method embodiment in FIG. 3 to FIG. 7. An implementation principle and a technical effect thereof are similar. Therefore, the service flow processing policy of a forwarding plane is isolated from different control domains, a controller having no permission is prevented from modifying the service flow processing policy, and a service flow is processed more correctly and securely.

Figure 12:
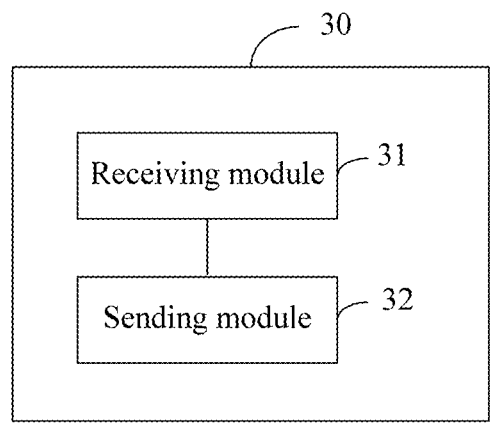
FIG. 12 is a schematic structural diagram of Embodiment 6 of a processing apparatus for a service flow processing policy according to the embodiments of the present disclosure.

FIG. 12 is a schematic structural diagram of Embodiment 6 of a processing apparatus for a service flow processing policy according to the embodiments of the present disclosure. As shown in FIG. 12, the service flow processing policy processing apparatus 30 includes: a receiving module 31 and a sending module 32, where the receiving module 31 is configured to receive a request for switching control right, where the request for switching control right is used to instruct the service flow processing policy processing apparatus to manage a service flow processing policy originally managed by a first controller; and the sending module 32 is configured to send an operation request for switching control domain to a forwarding plane device, where the operation request for switching control domain is used to instruct the forwarding plane device to update a correspondence between a control domain identifier and a service flow identifier.

The service flow processing policy processing apparatus provided in this embodiment is configured to execute the technical solution of the second controller in the method embodiment in FIG. 4A and FIG. 4B to FIG. 7. An implementation principle and a technical effect thereof are similar. Therefore, the service flow processing policy of a forwarding plane is isolated from different control domains, a controller having no permission is prevented from modifying the service flow processing policy, and a service flow is processed more correctly and securely.

Figure 13:
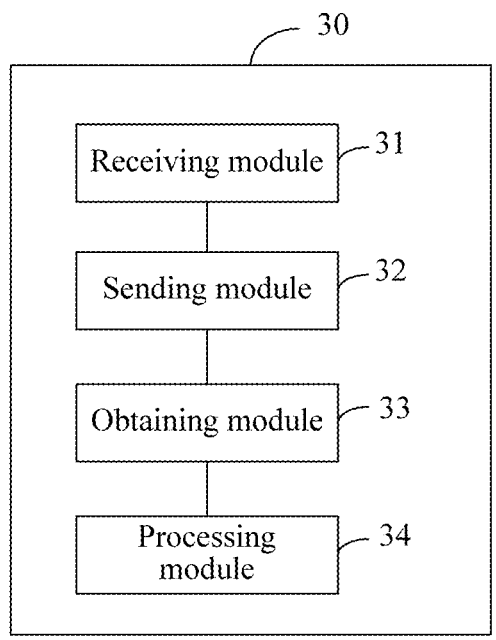
FIG. 13 is a schematic structural diagram of Embodiment 7 of a processing apparatus for a service flow processing policy according to the embodiments of the present disclosure.

FIG. 13 is a schematic structural diagram of Embodiment 7 of a processing apparatus for a service flow processing policy according to the embodiments of the present disclosure. As shown in FIG. 13, based on Embodiment 6, the service flow processing policy processing apparatus 30 further includes: an obtaining module 33 and a processing module 34, where the obtaining module 33 is configured to obtain service flow information managed by the first controller; and the processing module 34 is configured to generate a new service flow processing policy according to the service flow information, where the sending module 32 is further configured to send a request for installing the new service flow processing policy to the forwarding plane device, where the request for installing the new service flow processing policy includes the new service flow processing policy.

The service flow processing policy processing apparatus provided in this embodiment is configured to execute the technical solution of the second controller in the method embodiment in FIG. 4A and FIG. 4B to FIG. 7. An implementation principle and a technical effect thereof are similar. Details are not described herein again.

Figure 14:
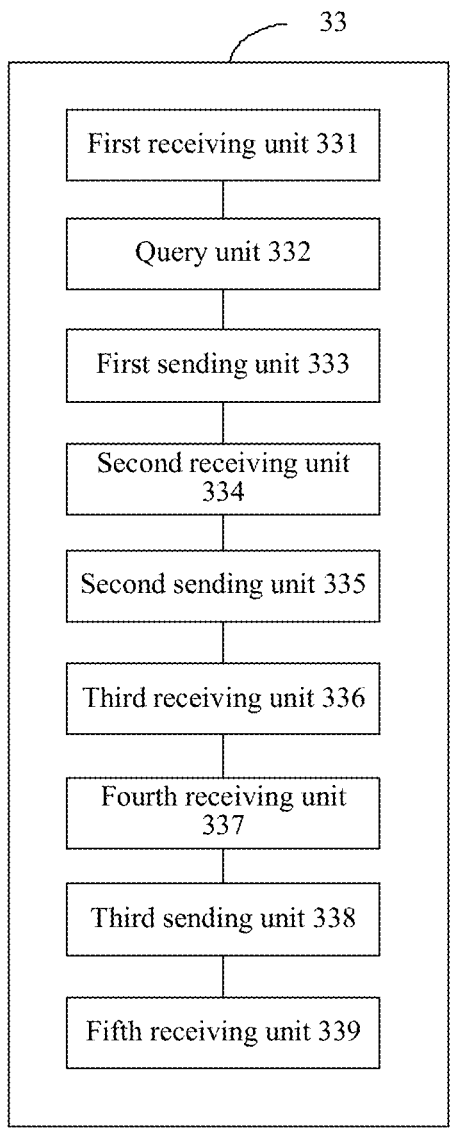
FIG. 14 is a schematic structural diagram of Embodiment 8 of a processing apparatus for a service flow processing policy according to the embodiments of the present disclosure.

FIG. 14 is a schematic structural diagram of Embodiment 8 of a processing apparatus for a service flow processing policy according to the embodiments of the present disclosure. As shown in FIG. 14, based on Embodiment 6, the obtaining module 33 includes:

a first receiving unit 331, configured to receive the request for switching control right from the forwarding plane device, where the request for switching control right includes the service flow information; or a query unit 332, configured to query a database to obtain the service flow information managed by the first controller; or a first sending unit 333, configured to send the operation request for switching control domain to the forwarding plane device, where the operation request for switching control domain carries a parameter for requesting to obtain the service flow information; and a second receiving unit 334, configured to receive the service flow information from a forwarding plane; or a second sending unit 335, configured to send a request for obtaining the service flow information to the forwarding plane device; and a third receiving unit 336, configured to receive the service flow information from the forwarding plane device, where the service flow information includes one or more service flow identifiers corresponding to a first control domain; or a fourth receiving unit 337, configured to receive the service flow information from the first controller; or a third sending unit 338, configured to send a request for obtaining the service flow information to the first controller; and a fifth receiving unit 339, configured to receive the service flow information from the first controller.

Optionally, the receiving module 31 is specifically configured to:

receive the request for switching control right from the forwarding plane device; or receive the request for switching control right from the first controller.

The service flow processing policy processing apparatus provided in this embodiment is configured to execute the technical solution of the second controller in the method embodiment in FIG. 4A and FIG. 4B to FIG. 7. An implementation principle and a technical effect thereof are similar. Details are not described herein again.

Figure 15:
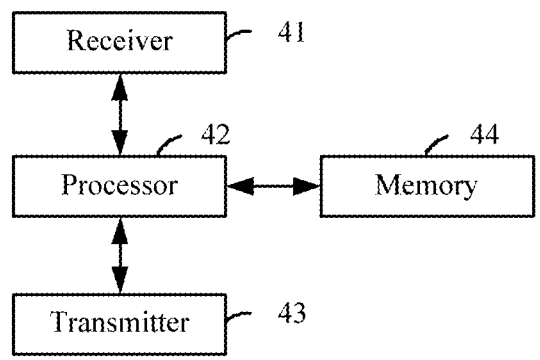
FIG. 15 is a schematic structural diagram of Embodiment 1 of a forwarding plane device according to the embodiments of the present disclosure.

FIG. 15 is a schematic structural diagram of Embodiment 1 of a forwarding plane device according to the embodiments of the present disclosure. As shown in FIG. 15, the forwarding plane device 40 includes: a receiver 41 and a processor 42. During specific implementation, the forwarding plane device 40 may further include a transmitter 43 and a memory 44 according to an actual application requirement.

The receiver 41 is configured to receive an operation request of a service flow processing policy from a first control domain, where the operation request of the service flow processing policy includes a service flow identifier corresponding to a to-be-processed policy;

the processor 42 is configured to obtain an identifier of the first control domain according to the operation request of the service flow processing policy, where the processor 42 is further configured to determine, according to the identifier of the first control domain and a pre-obtained correspondence between a control domain identifier and a service flow identifier, whether to allow the first control domain to operate the to-be-processed policy; and the processor 42 is further configured to: if determining to allow the first control domain to operate the to-be-processed policy, operate the to-be-processed policy according to the operation request of the service flow processing policy.

Optionally, the processor 42 is specifically configured to: obtain, according to the pre-obtained correspondence between a control domain identifier and a service flow identifier, a control domain identifier corresponding to the service flow identifier corresponding to the to-be-processed policy; determine whether the identifier of the first control domain is the same as the control domain identifier corresponding to the service flow identifier corresponding to the to-be-processed policy; and if the identifier of the first control domain is the same as the control domain identifier corresponding to the service flow identifier corresponding to the to-be-processed policy, allow the first control domain to operate the to-be-processed policy; or if the identifier of the first control domain is different from the control domain identifier corresponding to the service flow identifier corresponding to the to-be-processed policy, disallow the first control domain to operate the to-be-processed policy.

Optionally, the processor 42 is further configured to: obtain the identifier that is of the first control domain and that is carried in the operation request of the service flow processing policy; or use a source Internet Protocol address or a source port number that is included in the operation request of the service flow processing policy as the identifier of the first control domain; or use a control session identifier corresponding to the operation request of the service flow processing policy as the identifier of the first control domain; or use an identifier of a network slice corresponding to the operation request of the service flow processing policy as the identifier of the first control domain.

Optionally, the receiver 41 is further configured to receive a request for installing a service flow processing policy from at least one control domain, where the request for installing the service flow processing policy from each controller domain includes a service flow processing policy; and the processor 42 is further configured to obtain a correspondence between each control domain identifier and a service flow identifier according to the at least one request for installing a service flow processing policy.

Optionally, the processor 42 is further configured to: if it is detected that communication with the first control domain cannot be normally performed, suspend, according to a control domain identifier corresponding to a service flow processing policy, executing all service flow processing policies corresponding to the first control domain, or delete all service flow processing policies corresponding to the first control domain.

Optionally, the receiver 41 is further configured to receive an operation request for switching control domain from a second control domain, where the second control domain is any control domain other than the first control domain; and the processor 42 is further configured to update the correspondence between a control domain identifier and a service flow identifier according to the operation request for switching control domain.

Optionally, the transmitter 43 is configured to send a request for switching control right to the second control domain, so that a controller of the second control domain manages a service flow processing policy originally managed by a controller of the first control domain, where the request for switching control right includes the identifier of the first control domain.

Optionally, the transmitter 43 is configured to send a request for switching control right to the second control domain, where the request for switching control right includes the identifier and service flow information of the first control domain, and the service flow information includes one or more service flow identifiers corresponding to the first control domain; or the receiver 41 is further configured to receive a request for obtaining service flow information from the second control domain; and the transmitter 43 is further configured to send service flow information to the second control domain, where the service flow information includes one or more service flow identifiers corresponding to the first control domain.

Optionally, the receiver 41 is further configured to receive a request for installing a new service flow processing policy from the second control domain, where the request for installing the new service flow processing policy includes the new service flow processing policy, and the new service flow processing policy is generated by the second control domain according to service flow information of a service flow corresponding to the first control domain.

The forwarding plane device provided in this embodiment is configured to execute the technical solution in the method embodiment in FIG. 2 to FIG. 7. An implementation principle and a technical effect thereof are similar. Details are not described herein again.

Figure 16:
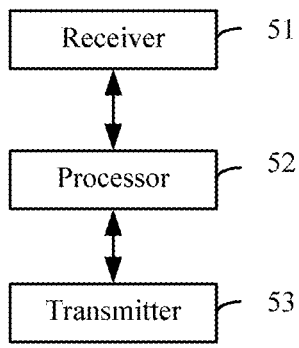
FIG. 16 is a schematic structural diagram of Embodiment 1 of a controller according to the embodiments of the present disclosure.

FIG. 16 is a schematic structural diagram of Embodiment 1 of a controller according to the embodiments of the present disclosure. As shown in FIG. 16, the controller 50 includes: a receiver 51, a processor 52, and a transmitter 53, where the receiver 51 is configured to receive an access request of a terminal device from a base station, where the access request of the terminal device includes service flow information of the terminal device;

the processor 52 is configured to generate, according to service flow information of the terminal device, a service flow processing policy for controlling a service flow of the terminal device; and the transmitter 53 is configured to send a request for installing the service flow processing policy to a forwarding plane device, where the request for installing the service flow processing policy includes the service flow processing policy and a service flow identifier corresponding to the service flow processing policy; and the transmitter 53 is further configured to: send an operation request of a service flow processing policy to the forwarding plane device, so that the forwarding plane device determines, according to the operation request of the service flow processing policy and a pre-obtained correspondence between a control domain identifier and a service flow identifier, whether to allow the service flow processing policy processing apparatus to operate a to-be-processed policy; and when a determining result is that the service flow processing policy processing apparatus is allowed to operate the to-be-processed policy, operates the to-be-processed policy according to the operation request of the service flow processing policy, where the operation request of the service flow processing policy includes a service flow identifier corresponding to the to-be-processed policy.

Optionally, the processor 52 is further configured to obtain the service flow information of the terminal device.

The processor 52 is further configured to generate, according to service flow information of the terminal device, the service flow processing policy for controlling a service flow of the terminal device; and the transmitter 53 is further configured to send a request for installing the service flow processing policy to the forwarding plane device, where the request for installing the service flow processing policy includes the service flow processing policy and a service flow identifier corresponding to the service flow processing policy.

Optionally, the transmitter 53 sends a request for switching control right to a second controller, where the request for switching control right includes an identifier of a first control domain.

Optionally, the transmitter 53 is further configured to send service flow information managed by the controller to the second controller, so that the second controller generates a new processing policy according to the service flow information; or the receiver 51 is further configured to receive a request for obtaining service flow information from the second controller; and the transmitter 53 is further configured to send the service flow information managed by the controller to the second controller, so that the second controller generates a new processing policy according to the service flow information.

The controller provided in this embodiment is configured to execute the technical solution of the first controller in the method embodiment in FIG. 2 to FIG. 7. An implementation principle and a technical effect thereof are similar. Details are not described herein again.

Figure 17:
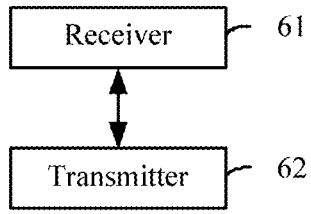
FIG. 17 is a schematic structural diagram of Embodiment 2 of a controller according to the embodiments of the present disclosure.

FIG. 17 is a schematic structural diagram of Embodiment 2 of a controller according to the embodiments of the present disclosure. As shown in FIG. 17, the controller 60 includes: a receiver 61 and a transmitter 62, where the receiver 61 is configured to receive a request for switching control right, where the request for switching control right is used to instruct the controller to manage a service flow processing policy originally managed by a first controller; and the transmitter 62 is configured to send an operation request for switching control domain to a forwarding plane device, where the operation request for switching control domain is used to instruct the forwarding plane device to update a correspondence between a control domain identifier and a service flow identifier.

Figure 18:
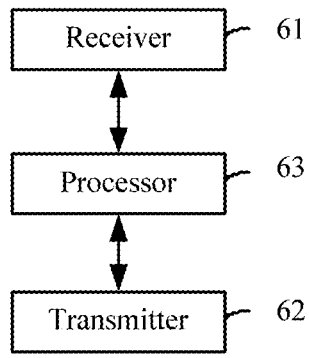
FIG. 18 is a schematic structural diagram of Embodiment 3 of a controller according to the embodiments of the present disclosure.

FIG. 18 is a schematic structural diagram of Embodiment 3 of a controller according to the embodiments of the present disclosure. As shown in FIG. 18, based on Embodiment 2, the controller 60 further includes: a processor 63, configured to obtain service flow information managed by a first controller, where the processor 63 is further configured to generate a new service flow processing policy according to the service flow information; and the transmitter 63 is further configured to send a request for installing the new service flow processing policy to the forwarding plane device, where the request for installing the new service flow processing policy includes the new service flow processing policy.

Optionally, the receiver 61 is further configured to receive the request for switching control right from the forwarding plane device, where the request for switching control right includes the service flow information; or the processor 63 is further configured to query a database to obtain the service flow information managed by the first controller; or the transmitter 62 is further configured to send the operation request for switching control domain to the forwarding plane device, where the operation request for switching control domain carries a parameter for requesting to obtain the service flow information; and the receiver 61 is further configured to receive the service flow information from a forwarding plane; or the transmitter 62 is further configured to send a request for obtaining the service flow information to the forwarding plane device; and the receiver 61 is further configured to receive the service flow information from the forwarding plane device, where the service flow information includes one or more service flow identifiers corresponding to a first control domain; or the receiver 61 is further configured to receive the service flow information from the first controller; or the transmitter 62 is further configured to send a request for obtaining the service flow information to the first controller; and the receiver 61 is further configured to receive the service flow information from the first controller.

Optionally, the receiver 61 is specifically configured to:

receive the request for switching control right from the forwarding plane device; or receive the request for switching control right from the first controller.

The controller provided in this embodiment is configured to execute the technical solution of the second controller in the method embodiment in FIG. 4A and FIG. 4B to FIG. 7. An implementation principle and a technical effect thereof are similar. Details are not described herein again.

Figure 19:
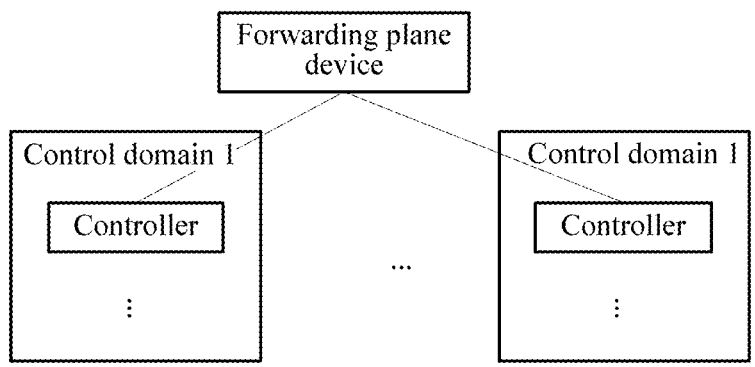
FIG. 19 is a schematic architectural diagram of Embodiment 1 of a processing system for a service flow processing policy according to the embodiments of the present disclosure.

FIG. 19 is a schematic architectural diagram of Embodiment 1 of a processing system for a service flow processing policy according to the embodiments of the present disclosure. As shown in FIG. 19, the service flow processing policy processing system includes: a forwarding plane device and at least one control domain, where each control domain includes at least one controller; and the forwarding plane device is configured to: receive an operation request of a service flow processing policy from a first control domain, where the operation request of the service flow processing policy includes a service flow identifier corresponding to a to-be-processed policy; obtain an identifier of the first control domain according to the operation request of the service flow processing policy; determine, according to the identifier of the first control domain and a pre-obtained correspondence between a control domain identifier and a service flow identifier, whether to allow a first controller to operate the to-be-processed policy; and if determining to allow the first controller to operate the to-be-processed policy, operate the to-be-processed policy according to the operation request of the service flow processing policy.

The service flow processing policy processing system provided in this embodiment is configured to execute the technical solution in the method embodiment in FIG. 2 to FIG. 7. An implementation principle and a technical effect thereof are similar. Details are not described herein again.

It should be understood that in the foregoing embodiments of the terminal device and server, the processor may be a central processing unit (CPU), or may be another general-purpose processor, a digital signal processor (DSP), an application-specific integrated circuit (ASIC), or the like. The general-purpose processor may be a microprocessor, or the processor may further be any conventional processor, or the like. Steps of the method disclosed with reference to the embodiments of the present disclosure may be directly performed and completed by means of a hardware processor, or may be performed and completed by using a combination of hardware and software modules in the processor.

Persons of ordinary skill in the art may understand that all or some of the steps of the method embodiments may be implemented by a program instructing relevant hardware. The program may be stored in a computer-readable storage medium. When the program is executed, the steps of the methods in the embodiments are performed. The storage medium includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A processing method for a service flow processing policy, the method comprising:
   receiving, by a forwarding plane device, an operation request of the service flow processing policy from a first control domain, wherein the operation request of the service flow processing policy comprises a first service flow identifier corresponding to a to-be-processed policy;
   obtaining, by the forwarding plane device, an identifier of the first control domain according to the operation request of the service flow processing policy;
   determining, by the forwarding plane device, whether to allow the first control domain to operate the to-be-processed policy according to the identifier of the first control domain, a first control domain identifier corresponding to the first service flow identifier, and a pre-obtained correspondence between a control domain identifier and a service flow identifier, wherein the forwarding plane device obtains the first control domain identifier according to the pre-obtained correspondence between the control domain identifier and the service flow identifier; and
   allowing or disallowing the first control domain to operate the to-be-processed policy when the forwarding plane device determines that the identifier of the first control domain and the first control domain identifier are the same or different, respectively.

2. The method according to claim 1, wherein obtaining the identifier of the first control domain according to the operation request comprises one of:
   obtaining, by the forwarding plane device, the identifier of the first control domain carried in the operation request;
   using, by the forwarding plane device, a source Internet Protocol address or a source port number carried in the operation request as the identifier of the first control domain;
   using, by the forwarding plane device, a control session identifier corresponding to the operation request as the identifier of the first control domain; or
   using, by the forwarding plane device, an identifier of a network slice corresponding to the operation request as the identifier of the first control domain.

3. The method according to claim 1, wherein the first control domain comprises at least one of: a controller, a controller group comprising at least two controllers, or a network slice comprising at least one controller.

4. The method according to claim 1, wherein before receiving the operation request of the service flow processing policy, the method further comprises:
   receiving, by the forwarding plane device, a request for installing the service flow processing policy from the first control domain, wherein the request for installing the service flow processing policy comprises the service flow processing policy and the first service flow identifier corresponding to the service flow processing policy; and
   obtaining, by the forwarding plane device, a correspondence between each control domain identifier of each control domain and a service flow identifier according to the request for installing the service flow processing policy.

5. The method according to claim 1, wherein when the forwarding plane device detects that communication with the first control domain cannot be normally performed, the method further comprises either:
   suspending, by the forwarding plane device according to a control domain identifier corresponding to a service flow processing policy, execution of service flow processing policies corresponding to the first control domain; or
   deleting service flow processing policies corresponding to the first control domain.

6. The method according to claim 1, further comprising:
   receiving, by the forwarding plane device, a second operation request for switching control domain from a second control domain, wherein the second control domain is any control domain other than the first control domain; and
   updating, by the forwarding plane device, the pre-obtained correspondence between the control domain identifier and the service flow identifier according to the second operation request for switching control domain.

7. The method according to claim 6, further comprising sending, by the forwarding plane device, a request for switching control rights to the second control domain, wherein the request for switching control rights comprises the identifier of the first control domain.

8. The method according to claim 6, further comprising sending, by the forwarding plane device, a request for switching control rights to the second control domain, wherein the request for switching control rights comprises the identifier and first service flow information of the first control domain, and wherein the service flow information comprises one or more service flow identifiers corresponding to the first control domain.

9. The method according to claim 6, further comprising receiving, by the forwarding plane device, a request for installing a new service flow processing policy from the second control domain, wherein the request for installing the new service flow processing policy comprises the new service flow processing policy.

10. The method according to claim 6, further comprising:
receiving, by the forwarding plane device, a request for obtaining service flow information from the second control domain; and
sending, by the forwarding plane device, the service flow information to the second control domain, wherein the service flow information comprises one or more service flow identifiers corresponding to the first control domain.

11. An apparatus for a service flow processing policy, the apparatus comprising:
a receiver configured to receive an operation request of the service flow processing policy from a first control domain, wherein the operation request of the service flow processing policy comprises a first service flow identifier corresponding to a to-be-processed policy; and
a processor coupled to the receiver and configured to:
obtain an identifier of the first control domain according to the operation request of the service flow processing policy,
determine whether to allow the first control domain to operate the to-be-processed policy according to the identifier of the first control domain, a first control domain identifier corresponding to the first service flow identifier, and a pre-obtained correspondence between a control domain identifier and a service flow identifier, wherein the processor obtains the first control domain identifier according to the pre-obtained correspondence between the control domain identifier and the service flow identifier; and
allow or disallow the first control domain to operate the to-be-processed policy when the processor determines that the identifier of the first control domain and the first control domain identifier are the same or different, respectively.

12. The apparatus according to claim 11, wherein to obtain the identifier of the first control domain according to the operation request, the processor is further configured to:
obtain the identifier of the first control domain carried in the operation request;
use a source Internet Protocol address or a source port number carried in the operation request as the identifier of the first control domain;
use a control session identifier corresponding to the operation request as the identifier of the first control domain; or
use an identifier of a network slice corresponding to the operation request as the identifier of the first control domain.

13. The apparatus according to claim 11, wherein the receiver is further configured to receive a request for installing the service flow processing policy from the first control domain, wherein the request for installing the service flow processing policy comprises the service flow processing policy, and
wherein the processor is further configured to obtain a correspondence between each control domain identifier and a service flow identifier according to the request for installing the service flow processing policy.

14. The apparatus according to claim 11, wherein when it is detected that communication with the first control domain cannot be normally performed, the processor is further configured to either:

suspend, according to a control domain identifier corresponding to a service flow processing policy, execution of service flow processing policies corresponding to the first control domain; or
delete service flow processing policies corresponding to the first control domain.

15. The apparatus according to claim 11, wherein the receiver is further configured to receive a second operation request for switching control domain from a second control domain, wherein the second control domain is any control domain other than the first control domain, and
wherein the processor is further configured to update the pre-obtained correspondence between a control domain identifier and a service flow identifier according to the second operation request for switching control domain.

16. The apparatus according to claim 15, wherein the apparatus further comprises a transmitter configured to send a request for switching control rights to the second control domain, and wherein the request for switching control comprises the identifier of the first control domain.

17. The apparatus according to claim 15, wherein the apparatus further comprises a transmitter configured to send a request for switching control rights to the second control domain, wherein the request for switching control rights comprises the identifier and service flow information of the first control domain, and wherein the service flow information comprises one or more service flow identifiers corresponding to the first control domain.

18. The apparatus according to claim 15, wherein the receiver is further configured to receive a request for installing a new service flow processing policy from the second control domain, and wherein the request for installing the new service flow processing policy comprises the new service flow processing policy.

19. The apparatus according to claim 15, wherein the receiver is further configured to receive a request for obtaining service flow information from the second control domain, wherein the transmitter is further configured to send the service flow information to the second control domain, and wherein the service flow information comprises one or more service flow identifiers corresponding to the first control domain.

20. A non-transitory computer-readable medium storing computer instructions which, when executed by one or more processors, cause the one or more processors to:
receive an operation request of the service flow processing policy from a first control domain, wherein the operation request of the service flow processing policy comprises a first service flow identifier corresponding to a to-be-processed policy;
obtain an identifier of the first control domain according to the operation request of the service flow processing policy;
determine whether to allow the first control domain to operate the to-be-processed policy, according to the identifier of the first control domain, a first control domain identifier corresponding to the first service flow identifier, and a pre-obtained correspondence between a control domain identifier and a service flow identifier, wherein the first control domain identifier is obtained according to the pre-obtained correspondence between the control domain identifier and the service flow identifier; and
allow or disallow the first control domain to operate the to-be-processed policy when the one or more processors determine that the identifier of the first control domain and the first control domain identifier are the same or different, respectively.

* * * * *